US011653627B2

(12) United States Patent
Yoo et al.

(10) Patent No.: US 11,653,627 B2
(45) Date of Patent: May 23, 2023

(54) LIQUID DISPENSER FOR ANIMALS

(71) Applicant: LG ELECTRONICS INC., Seoul (KR)

(72) Inventors: Hyunsun Yoo, Seoul (KR); Jaehung Chun, Seoul (KR); Yousook Eun, Seoul (KR); Joogyeom Kim, Seoul (KR); Sungkyung Kim, Seoul (KR); Myongsun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 16/571,089

(22) Filed: Sep. 14, 2019

(65) Prior Publication Data

US 2020/0084999 A1    Mar. 19, 2020

Related U.S. Application Data

(60) Provisional application No. 62/733,393, filed on Sep. 19, 2018.

(30) Foreign Application Priority Data

Oct. 30, 2018   (KR) .................. 10-2018-0131037
May 22, 2019   (KR) .................. 10-2019-0059785

(51) Int. Cl.
| | |
|---|---|
| *H02J 50/90* | (2016.01) |
| *A01K 7/02* | (2006.01) |
| *H02J 50/10* | (2016.01) |
| *B01D 29/56* | (2006.01) |
| *B67D 3/00* | (2006.01) |

(Continued)

(52) U.S. Cl.
CPC .............. *A01K 7/02* (2013.01); *B01D 29/56* (2013.01); *B67D 3/0003* (2013.01); *C02F 1/003* (2013.01);

(Continued)

(58) Field of Classification Search
CPC .......... A01K 7/02; A01K 7/025; B01D 29/56; B67D 3/0003; C02F 1/003; C02F 1/32;

(Continued)

(56) References Cited

U.S. PATENT DOCUMENTS

| 1,218,969 A | 3/1917 | Ziener |
| 1,512,629 A | 10/1924 | Mueller et al. |

(Continued)

FOREIGN PATENT DOCUMENTS

| CA | 2082083 | 5/1994 |
| CA | 2587229 | 5/2006 |

(Continued)

OTHER PUBLICATIONS

European Search Report dated Apr. 17, 2020 issued in EP Application No. 19198180.2.

(Continued)

*Primary Examiner* — Daniel Kessie
*Assistant Examiner* — Brian K Baxter
(74) *Attorney, Agent, or Firm* — Ked & Associates, LLP

(57) ABSTRACT

A liquid dispenser may include a tank having a bottom plate, an inner assembly detachably coupled to the tank and containing a pump, and a docking station provided below the bottom plate that receives external power. A wireless power receiver may be provided above the bottom plate and may be electrically connected to a wireless power transmitter provided below the bottom plate. A supply plate may coupled to a supply pipe that supplies liquid pumped from the pump, and liquid falling from the supply plate may be guided back to the tank via a liquid guide. The docking station may apply external power to the pump via the wireless power transmitter and receiver.

20 Claims, 8 Drawing Sheets

(51) Int. Cl.
*C02F 1/00* (2023.01)
*C02F 1/32* (2023.01)
*H02J 50/00* (2016.01)
*H02J 7/00* (2006.01)

(52) U.S. Cl.
CPC .............. *C02F 1/32* (2013.01); *H02J 7/0044* (2013.01); *H02J 50/005* (2020.01); *H02J 50/10* (2016.02); *H02J 50/90* (2016.02)

(58) Field of Classification Search
CPC .. H02J 7/025; H02J 50/10; H02J 50/40; H02J 50/90; E03B 9/20
See application file for complete search history.

(56) References Cited

U.S. PATENT DOCUMENTS

| | | |
|---|---|---|
| 2,103,653 A | 12/1937 | Weil |
| 2,510,446 A | 6/1950 | Weil |
| 3,076,435 A | 2/1963 | Seymour |
| 3,303,824 A | 2/1967 | Anderson |
| 3,441,003 A | 4/1969 | Du Mond et al. |
| D221,755 S | 9/1971 | Johnson |
| 3,691,787 A | 9/1972 | Kaufmann |
| 3,765,614 A | 10/1973 | Bartl et al. |
| 4,100,885 A | 7/1978 | Kapplinger |
| 4,133,456 A | 1/1979 | Corini |
| 4,286,546 A | 9/1981 | Moore |
| 4,561,384 A | 12/1985 | Liff |
| 4,640,226 A | 2/1987 | Liff |
| 4,932,561 A | 6/1990 | Boxall |
| 5,031,689 A | 7/1991 | Jones et al. |
| 5,105,771 A | 4/1992 | Schafer |
| 5,140,134 A | 8/1992 | Reusche et al. |
| 5,174,245 A | 12/1992 | Bishop |
| 5,205,242 A | 4/1993 | Kasselman |
| 5,209,069 A | 5/1993 | Newnan |
| 5,345,063 A | 9/1994 | Reusche et al. |
| 5,601,199 A | 2/1997 | Marty |
| 5,699,669 A | 12/1997 | Gebhard |
| 5,782,094 A | 7/1998 | Freeman |
| 5,791,287 A | 8/1998 | Gruber |
| 5,799,609 A | 9/1998 | Burns et al. |
| 5,845,605 A | 12/1998 | Malamphy |
| 5,884,582 A | 3/1999 | Duckworth |
| 5,941,077 A | 8/1999 | Safyan |
| 6,003,318 A | 12/1999 | Busick |
| 6,230,653 B1 | 5/2001 | Tobin |
| 6,460,483 B1 | 10/2002 | Northrop et al. |
| 6,622,657 B2 | 9/2003 | Northrop et al. |
| 6,644,037 B2 | 11/2003 | Busick |
| 6,705,540 B2 | 3/2004 | Koshiyama et al. |
| 6,848,392 B1 | 2/2005 | Kreutzer, Jr. |
| 7,089,881 B2 | 8/2006 | Plante |
| 7,270,082 B2 | 9/2007 | Plante |
| 7,549,395 B2 | 6/2009 | Stenberg |
| 7,600,486 B2 | 10/2009 | Ellis |
| 7,743,698 B2 | 6/2010 | Muir et al. |
| 7,823,538 B1 | 11/2010 | Merager |
| 7,958,844 B1 | 6/2011 | Northrop |
| 8,117,991 B1 | 2/2012 | Civitillo |
| 8,210,447 B2 | 7/2012 | Cohen |
| 8,387,566 B2 | 3/2013 | Graves et al. |
| 8,770,147 B2 | 7/2014 | Rowe |
| 8,770,148 B2 | 7/2014 | Lipscomb et al. |
| 9,035,222 B2 | 5/2015 | Alexander |
| D738,579 S | 9/2015 | Owens et al. |
| D755,449 S | 5/2016 | Cornwell, Jr. et al. |
| 9,497,930 B2 | 11/2016 | Lipscomb et al. |
| 1,243,126 A1 | 10/2017 | Ziener |
| D819,898 S | 6/2018 | Poisson et al. |
| 10,165,753 B1 | 1/2019 | Huang |
| 11,154,034 B2 | 10/2021 | Youn et al. |
| 11,160,250 B2 | 11/2021 | Yoo et al. |
| 2002/0020673 A1 | 2/2002 | Nohren et al. |
| 2003/0115902 A1 | 6/2003 | Busick et al. |
| 2003/0140864 A1 | 7/2003 | Wenstrand |
| 2003/0213437 A1 | 11/2003 | Norris |
| 2005/0166853 A1 | 8/2005 | Plante |
| 2006/0174838 A1 | 8/2006 | Plante |
| 2006/0231040 A1 | 10/2006 | Bast et al. |
| 2006/0288947 A1 | 12/2006 | Perlsweig et al. |
| 2007/0045159 A1 | 3/2007 | Lee |
| 2007/0095297 A1 | 5/2007 | Boyd |
| 2007/0199512 A1 | 8/2007 | Ellis |
| 2007/0227456 A1 | 10/2007 | Borey |
| 2008/0078330 A1 | 4/2008 | McCallum et al. |
| 2008/0169249 A1 | 7/2008 | Ter Stege |
| 2008/0190374 A1 | 8/2008 | Farris |
| 2008/0257272 A1 | 10/2008 | Bolda |
| 2009/0126641 A1 | 5/2009 | Anderson et al. |
| 2009/0218985 A1* | 9/2009 | Hallett .............. H02J 7/00047 320/108 |
| 2010/0095897 A1 | 4/2010 | Rowe |
| 2010/0276508 A1 | 11/2010 | Davies |
| 2010/0300366 A1 | 12/2010 | Lipscomb et al. |
| 2011/0067638 A1 | 3/2011 | Lipscomb et al. |
| 2011/0102945 A1 | 5/2011 | Isono et al. |
| 2011/0214613 A1 | 9/2011 | Diamond |
| 2011/0226470 A1 | 9/2011 | Latrille et al. |
| 2011/0259273 A1 | 10/2011 | Lipscomb et al. |
| 2012/0017839 A1 | 1/2012 | Veness et al. |
| 2012/0111280 A1 | 5/2012 | Shin et al. |
| 2012/0216751 A1 | 8/2012 | Rowe |
| 2013/0087102 A1 | 4/2013 | Lipscomb et al. |
| 2013/0092090 A1 | 4/2013 | McCallum |
| 2013/0175802 A1 | 7/2013 | Breau et al. |
| 2013/0192529 A1 | 8/2013 | Kruger et al. |
| 2013/0200064 A1* | 8/2013 | Alexander ......... A47G 19/2288 219/441 |
| 2013/0228132 A1 | 9/2013 | Lipscomb et al. |
| 2013/0255280 A1 | 10/2013 | Murphy et al. |
| 2014/0033984 A1* | 2/2014 | Li ........................ A01K 63/065 119/247 |
| 2014/0053781 A1 | 2/2014 | Lewis |
| 2014/0076242 A1 | 3/2014 | Ho |
| 2014/0165607 A1 | 6/2014 | Alexander |
| 2014/0251223 A1 | 9/2014 | Rowe et al. |
| 2014/0353335 A1 | 12/2014 | Van Diepen |
| 2015/0135728 A1 | 5/2015 | Swanson et al. |
| 2015/0189862 A1 | 7/2015 | Lipscomb |
| 2015/0196157 A1 | 7/2015 | Swisth |
| 2015/0276204 A1 | 10/2015 | Ray |
| 2015/0313180 A1 | 11/2015 | Lipscomb et al. |
| 2015/0353335 A1 | 12/2015 | Breault |
| 2016/0000037 A1 | 1/2016 | Lipscomb et al. |
| 2016/0099599 A1* | 4/2016 | Ho ........................ H02J 7/025 320/108 |
| 2016/0113249 A1 | 4/2016 | Kuo |
| 2016/0118179 A1 | 4/2016 | Park et al. |
| 2016/0159633 A1 | 6/2016 | Diffenderfer |
| 2016/0286757 A1 | 10/2016 | Armstrong |
| 2016/0287363 A1* | 10/2016 | Miller ................ A46B 15/0042 |
| 2017/0245465 A1 | 8/2017 | Oates et al. |
| 2017/0255186 A1 | 9/2017 | Ryznar et al. |
| 2018/0054073 A1* | 2/2018 | Olson .................. H02J 7/0045 |
| 2018/0160648 A1 | 6/2018 | Goh |
| 2018/0177325 A1 | 6/2018 | Lyons et al. |
| 2019/0075755 A1 | 3/2019 | Imaizumi et al. |
| 2019/0140471 A1* | 5/2019 | Johanski ................. H02J 50/10 |
| 2019/0162460 A1 | 5/2019 | Oh |
| 2019/0227580 A1 | 7/2019 | von der Assen et al. |
| 2019/0239476 A1 | 8/2019 | Mai et al. |
| 2019/0239491 A1* | 8/2019 | Yu ........................ H02K 21/18 |
| 2019/0357747 A1* | 11/2019 | Keiler, III ............. A47L 9/2873 |
| 2020/0303971 A1* | 9/2020 | Hall ....................... H02J 50/05 |
| 2020/0337266 A1 | 10/2020 | Yu et al. |
| 2020/0355751 A1 | 11/2020 | Swaans et al. |

FOREIGN PATENT DOCUMENTS

| | | |
|---|---|---|
| CH | 711714 | 1/2022 |
| CN | 2322412 | 6/1999 |

(56) References Cited

FOREIGN PATENT DOCUMENTS

| | | |
|---|---|---|
| CN | 2351955 | 12/1999 |
| CN | 1701206 | 11/2005 |
| CN | 2776044 | 5/2006 |
| CN | 1870903 | 11/2006 |
| CN | 200994393 | 12/2007 |
| CN | 200994394 | 12/2007 |
| CN | 201365463 | 12/2009 |
| CN | 201422313 | 3/2010 |
| CN | 201530253 | 7/2010 |
| CN | 101790970 | 8/2010 |
| CN | 201541568 | 8/2010 |
| CN | 101816289 | 9/2010 |
| CN | 101841191 | 9/2010 |
| CN | 102072468 | 5/2011 |
| CN | 102480927 | 5/2012 |
| CN | 102600661 | 7/2012 |
| CN | 202310894 | 7/2012 |
| CN | 102934044 | 2/2013 |
| CN | 202722224 | 2/2013 |
| CN | 202873523 | 4/2013 |
| CN | 203136752 | 8/2013 |
| CN | 203544552 | 4/2014 |
| CN | 203618522 | 6/2014 |
| CN | 103917147 | 7/2014 |
| CN | 103931515 | 7/2014 |
| CN | 203913286 | 11/2014 |
| CN | 204707695 | 10/2015 |
| CN | 204722018 | 10/2015 |
| CN | 105265331 | 1/2016 |
| CN | 205005702 | 2/2016 |
| CN | 105792644 | 7/2016 |
| CN | 205431490 | 8/2016 |
| CN | 105923696 | 9/2016 |
| CN | 205682161 | 11/2016 |
| CN | 106172064 | 12/2016 |
| CN | 106212310 | 12/2016 |
| CN | 205830734 | 12/2016 |
| CN | 106332801 | 1/2017 |
| CN | 205884322 | 1/2017 |
| CN | 106787233 | 5/2017 |
| CN | 206142936 | 5/2017 |
| CN | 206227319 | 6/2017 |
| CN | 106962218 | 7/2017 |
| CN | 206314381 | 7/2017 |
| CN | 107041318 | 8/2017 |
| CN | 107124043 | 9/2017 |
| CN | 107259458 | 10/2017 |
| CN | 107509653 | 12/2017 |
| CN | 206699096 | 12/2017 |
| CN | 206760412 | 12/2017 |
| CN | 206760441 | 12/2017 |
| CN | 107568092 | 1/2018 |
| CN | 206851699 | 1/2018 |
| CN | 107660756 | 2/2018 |
| CN | 206949206 | 2/2018 |
| CN | 107821202 | 3/2018 |
| CN | 107897027 | 4/2018 |
| CN | 207268238 | 4/2018 |
| CN | 107969351 | 5/2018 |
| CN | 207411173 | 5/2018 |
| CN | 207443927 | 6/2018 |
| CN | 207519400 | 6/2018 |
| CN | 108271728 | 7/2018 |
| CN | 108353810 | 8/2018 |
| CN | 108377928 | 8/2018 |
| CN | 108464253 | 8/2018 |
| CN | 207740217 | 8/2018 |
| CN | 207803161 | 9/2018 |
| CN | 207870035 | 9/2018 |
| CN | 109513315 | 3/2019 |
| CN | 109997713 | 7/2019 |
| DE | 20 2016 107 252 | 3/2018 |
| EP | 0 894 430 | 2/1999 |
| EP | 1 188 995 | 3/2002 |
| EP | 1 566 099 | 8/2005 |
| EP | 3 315 022 | 5/2015 |
| EP | 3 520 607 | 8/2019 |
| FR | 2 726 452 | 5/1996 |
| GB | 2 458 173 | 9/2009 |
| GB | 2574921 | 12/2019 |
| JP | H05-118725 | 5/1993 |
| JP | H07-269800 | 10/1995 |
| JP | 2012-188163 | 10/2012 |
| JP | 3200546 | 10/2015 |
| JP | 2017-148018 | 8/2017 |
| JP | 2018-057340 | 4/2018 |
| KR | 10-1825334 | 12/1999 |
| KR | 10-0835557 | 6/2008 |
| KR | 10-2010-0046615 | 5/2010 |
| KR | 10-1116332 | 3/2012 |
| KR | 10-2013-0136123 | 12/2013 |
| KR | 10-2014-0042949 | 4/2014 |
| KR | 20-0475039 | 11/2014 |
| KR | 10-2017-0003154 | 1/2017 |
| KR | 10-2017-0017718 | 2/2017 |
| KR | 10-1898661 | 9/2018 |
| RU | 2650560 | 4/2018 |
| TW | 201641007 | 12/2016 |
| TW | I 574614 | 3/2017 |
| WO | WO 2009/016604 | 2/2009 |
| WO | WO 2010/138799 | 12/2010 |
| WO | WO 2011/035320 | 3/2011 |
| WO | WO 2013/012943 | 1/2013 |
| WO | WO 2014/209159 | 12/2014 |
| WO | WO 2017/185053 | 10/2017 |

OTHER PUBLICATIONS

European Search Report dated Apr. 17, 2020 issued in EP Application No. 19198307.1.
European Search Report dated Apr. 20, 2020 issued in EP Application No. 19198310.5.
European Search Report dated Apr. 20, 2020 issued in EP Application No. 19198368.3.
Chinese Office Action dated May 17, 2021 issued in CN Application No. 201910889361.9.
European Search Report dated Feb. 27, 2020 issued in Application No. 19198292.5.
European Search Report dated Feb. 27, 2020 issued in Application No. 19198298.2.
Chinese Office Action dated May 21, 2021 issued in CN Application No. 201910888661.5.
United States Office Action dated May 11, 2021 issued in related co-pending U.S. Appl. No. 16/571,093.
European Search Report dated Apr. 23, 2020 issued in EP Application No. 19198303.0.
Chinese Office Action dated May 17, 2021 issued in CN Application No. 201910887029.9.
Chinese Office Action dated May 17, 2021 issued in CN Application No. 201910889360.4.
Chinese Office Action dated May 18, 2021 issued in CN Application No. 201910888671.9.
U.S. Appl. No. 16/569,841, filed Sep. 13, 2019.
European Search Report dated Feb. 3, 2020 issued in EP Application No. 19198170.3.
United States Office Action dated Mar. 30, 2021 issued in related co-pending U.S. Appl. No. 16/571,090.
European Search Report dated Feb. 24, 2020 issued in EP Application No. 19198289.1.
Chinese Office Action dated Mar. 31, 2021 issued in CN Application No. 201910886533.7.
United States Office Action dated Apr. 27, 2021 issued in related co-pending U.S. Appl. No. 16/569,841.
United States Office Action dated Apr. 27, 2021 issued in related co-pending U.S. Appl. No. 16/574,418.
Chinese Office Action issued in Application No. 201910887007.2 dated Apr. 20, 2021.
Chinese Office Action issued in Application No. 201910886974.7 dated Apr. 20, 2021.

(56) References Cited

OTHER PUBLICATIONS

Chinese Office Action issued in Application No. 201910886711.6 dated Apr. 20, 2021.
Chinese Office Action issued in Application No. 201910889081.8 dated Apr. 20, 2021.
Chinese Office Action issued in Application No. 201910888688.4 dated Apr. 21, 2021.
Chinese Office Action issued in Application No. 201910886539.4 dated Apr. 22, 2021.
Chinese Office Action issued in Application No. 201910889318.2 dated Apr. 22, 2021.
Chinese Office Action issued in Application No. 201910888721.3 dated Apr. 22, 2021.
Chinese Office Action issued in Application No. 201910888102.4 dated Apr. 26, 2021.
Chinese Office Action dated May 10, 2021 issued in CN Application No. 201910888718.1.
European Search Report dated Feb. 14, 2020 issued in Application No. 19198187.7.
European Search Report dated Feb. 14, 2020 issued in Application No. 19198196.8.
European Search Report dated Feb. 19, 2020 issued in Application No. 19198191.9.
European Search Report dated Feb. 19, 2020 issued in Application No. 19198200.8.
Chinese Office Action dated Nov. 10, 2021 issued in CN Application No. 201910886533.7.
Chinese Office Action dated Nov. 10, 2021 issued in CN Application No. 201910886714.X.
United States Office Action dated Oct. 5, 2021 issued in related co-pending U.S. Appl. No. 16/571,074.
United States Office Action dated Dec. 6, 2021 issued in related co-pending U.S. Appl. No. 16/569,827.
United States Office Action dated Dec. 10, 2021 issued in related co-pending U.S. Appl. No. 16/571,075.
European Search Report dated Apr. 9, 2020 issued in EP Application No. 19198174.5.
United States Office Action dated Jun. 2, 2020 issued in related co-pending U.S. Appl. No. 16/574,259.
U.S. Appl. No. 16/574,259, filed Sep. 18, 2019.
U.S. Appl. No. 16/574,418, filed Sep. 18, 2019.
U.S. Appl. No. 16/571,090, filed Sep. 14, 2019.
Chinese Office Action dated Mar. 30, 2021 issued in CN Application No. 201910886714.X.
Chinese Office Action dated Apr. 1, 2021 issued in CN Application No. 201910886305.X.
Chinese Office Action dated Apr. 9, 2021 issued in CN Application No. 201910886526.7.
European Search Report dated Feb. 3, 2020 issued in Application No. 19198173.7.
European Search Report dated Feb. 3, 2020 issued in Application No. 19198182.8.
European Search Report dated Feb. 3, 2020 issued in Application No. 19198183.6.
European Search Report dated Feb. 3, 2020 issued in Application No. 19198184.4.
European Search Report dated Feb. 3, 2020 issued in Application No. 19198186.9.
European Search Report dated Feb. 3, 2020 issued in Application No. 19198202.4.
European Search Report dated Feb. 10, 2020 issued in Application No. 19198265.1.
United States Office Action dated Feb. 1, 2022 issued in related co-pending U.S. Appl. No. 16/574,237.
Dong, CN108464253A Machine Translation Description, Aug. 31, 2018, obtained Jan. 13, 2022 (Year: 2018).
United States Office Action dated Mar. 14, 2022 issued in related co-pending U.S. Appl. No. 16/570,310.
United States Office Action dated Mar. 17, 2022 issued in related co-pending U.S. Appl. No. 16/574,581.
United States Office Action dated Feb. 11, 2022 issued in related co-pending U.S. Appl. No. 16/574,322.
Chinese Office Action issued in Application No. 201910888224.3 dated Apr. 12, 2021.
Chinese Office Action issued in Application No. 201910888611.7 dated Apr. 12, 2021.
Chinese Office Action issued in Application No. 201910888695.4 dated Apr. 16, 2021.
United States Office Action dated May 19, 2022 issued in crelated co-pending U.S. Appl. No. 16/569,827.
United States Office Action dated Jun. 1, 2022 issued in related co-pending U.S. Appl. No. 16/571,075.
United States Office Action dated Jun. 2, 2022 issued in related co-pending U.S. Appl. No. 16/570,279.
United States Office Action dated Jun. 15, 2022 issued in related co-pending U.S. Appl. No. 16/569,908.
United States Office Action dated Jun. 23, 2022 issued in related co-pending U.S. Appl. No. 16/574,368.
United States Office Action dated Jul. 5, 2022 issued in related co-pending U.S. Appl. No. 16/574,240.
United States Office Action dated Jul. 7, 2022 issued in related co-pending U.S. Appl. No. 16/574,474.
United States Office Action dated Jul. 29, 2022 issued in related co-pending U.S. Appl. No. 16/574,322.
Chinese Notice of Allowance dated Jul. 11, 2022 issued in CN Application No. 201910886305.X.
Chinese Notice of Allowance dated Apr. 8, 2022 issued in CN Application No. 201910888611.7.
United States Office Action dated Aug. 29, 2022 issued in related co-pending U.S. Appl. No. 16/571,245.
United States Office Action dated Sep. 19, 2022 issued in related co-pending U.S. Appl. No. 16/569,827.
Chinese Notice of Allowance dated Aug. 31, 2022 issued in CN Application No. 201910889318.2.
Chinese Office Action dated Sep. 21, 2022 issued in CN Application No. 201910888224.3.
United States Office Action dated Oct. 11, 2022 issued in related co-pending U.S. Appl. No. 16/570,279.
U.S. Appl. No. 16/574,219, filed Sep. 18, 2019.
U.S. Appl. No. 16/574,240, filed Sep. 18, 2019.
U.S. Appl. No. 16/574,237, filed Sep. 18, 2019.
U.S. Appl. No. 16/574,312, filed Sep. 18, 2019.
U.S. Appl. No. 16/574,349, filed Sep. 18, 2019.
U.S. Appl. No. 16/574,322, filed Sep. 18, 2019.
U.S. Appl. No. 16/574,368, filed Sep. 18, 2019.
U.S. Appl. No. 16/574,474, filed Sep. 18, 2019.
U.S. Appl. No. 16/574,581, filed Sep. 18, 2019.
U.S. Appl. No. 16/571,245, filed Sep. 16, 2019.
U.S. Appl. No. 16/571,093, filed Sep. 14, 2019.
U.S. Appl. No. 16/571,076, filed Sep. 14, 2019.
U.S. Appl. No. 16/571,074, filed Sep. 14, 2019.
U.S. Appl. No. 16/571,075, filed Sep. 14, 2019.
U.S. Appl. No. 16/571,073, filed Sep. 14, 2019.
U.S. Appl. No. 16/570,310, filed Sep. 13, 2019.
U.S. Appl. No. 16/570,279, filed Sep. 13, 2019.
U.S. Appl. No. 16/569,827, filed Sep. 13, 2019.
U.S. Appl. No. 16/569,908, filed Sep. 13, 2019.
United States Office Action dated Mar. 3, 2023 issued in co-pending related U.S. Appl. No. 16/574,474.
United States Office Action dated Feb. 23, 2023 issued in co-pending related U.S. Appl. No. 16/574,322.
Rao et al. (2015). Effect of Corrugation Angle on Heat Transfer Studies of Viscous Fluids in Corrugated Plate Heat Exchangers. International Journal of Engineering and Technology Innovation, 5(2), pp. 99-107. (Year: 2015).
U.S. Office Action dated Mar. 30, 2023 issued in U.S. Appl. No. 16/574,368.

\* cited by examiner

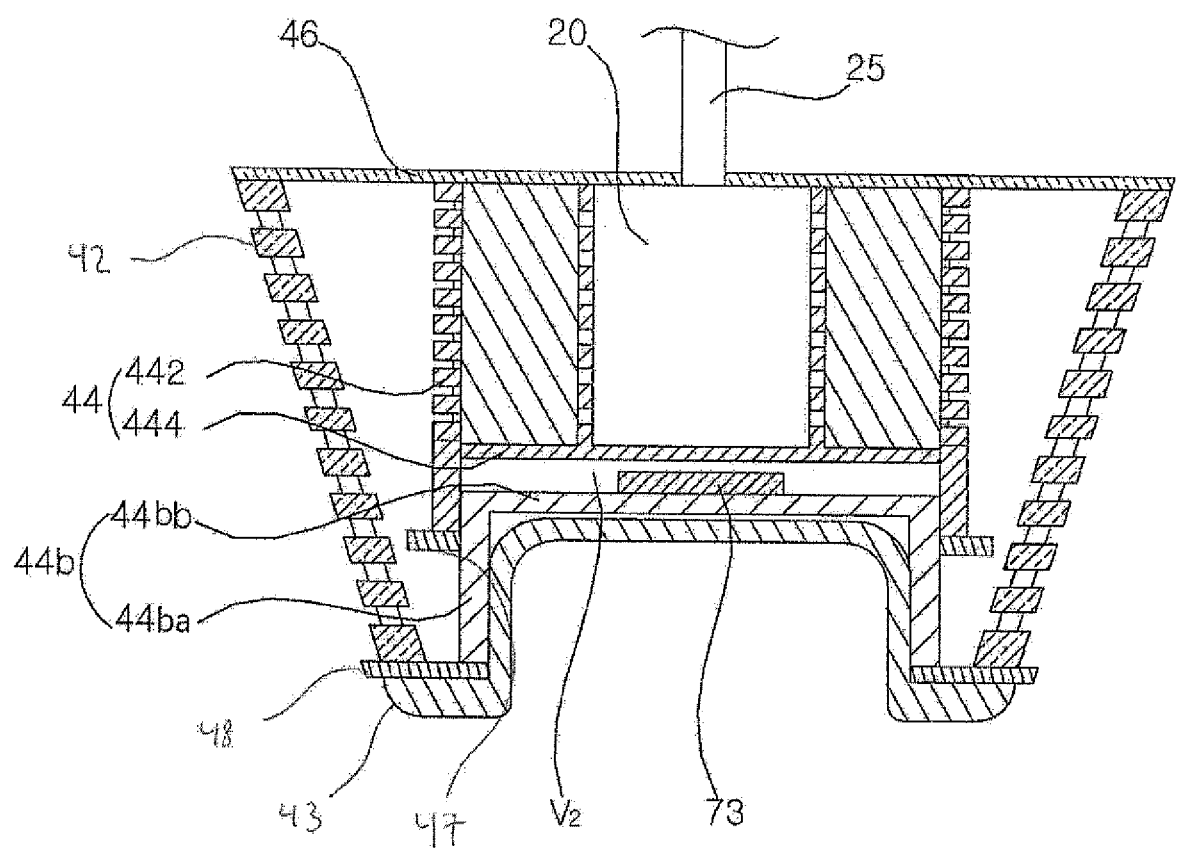

LIQUID DISPENSER FOR ANIMALS

CROSS-REFERENCE TO RELATED APPLICATION(S)

This application claims priority under 35 U.S.C. § 119 to U.S. Provisional Application No. 62/733,393 filed on Sep. 19, 2018, and Korean Application No. 10-2018-0131037 filed on Oct. 30, 2018, and 10-2019-0059785 filed on May 22, 2019, whose entire disclosure(s) is/are hereby incorporated by reference.

BACKGROUND

1. Field

A liquid dispenser to supply liquid to an animal, e.g., a pet, is disclosed herein.

2. Background

In recent years, the population of people raising a pet has increased, in addition to attachment and interest in pets. Like most animals, pets must drink water to survive and maintain a biorhythm. Since pets are often left alone and since communication with their owners is difficult, the demand for pet water dispensers or water supply devices has increased.

US Publication Nos. 2015/0313180, 2012/0216751, and 2014/0053781 and European Patent No. 3315022 disclose a drinking bowls for pets. However, such drinking bowls have various disadvantages, which the present disclosure solves.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 8 is a cross-sectional view of the filter and the pump shown in FIG. 7.

DETAILED DESCRIPTION OF THE INVENTION

Figure 1:
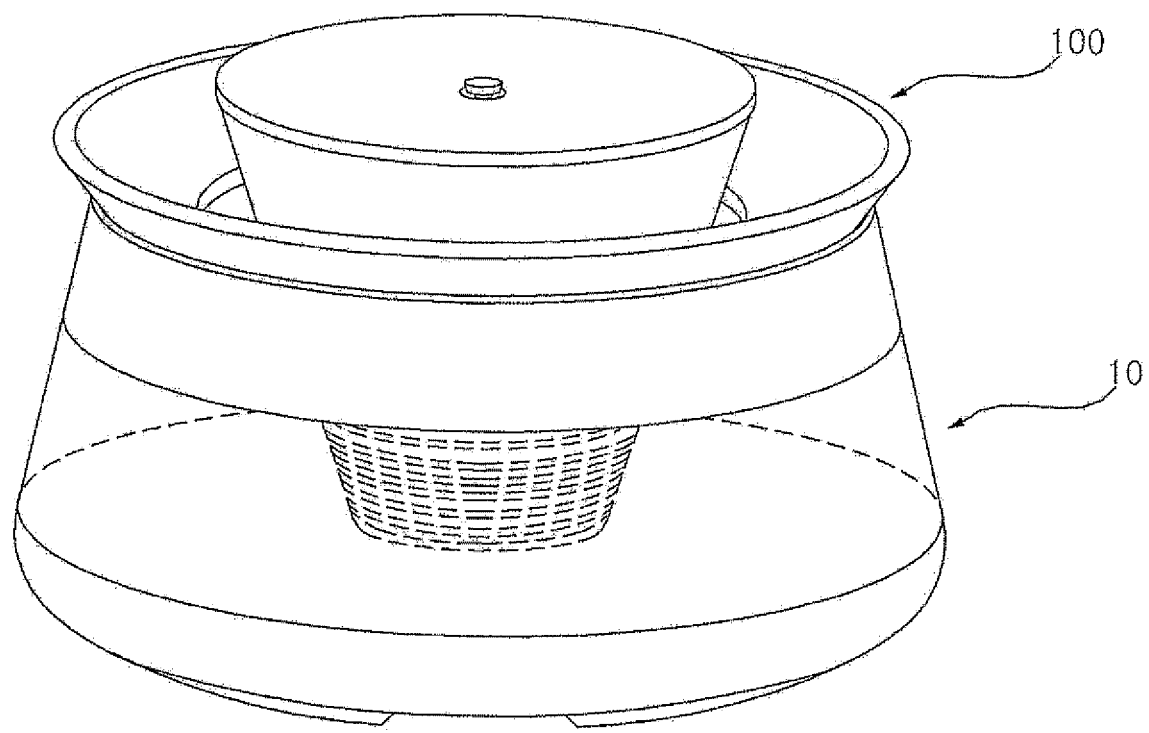
FIG. 1 is a perspective view showing an appearance of a pet water dispenser according to an embodiment.
Figure 2:
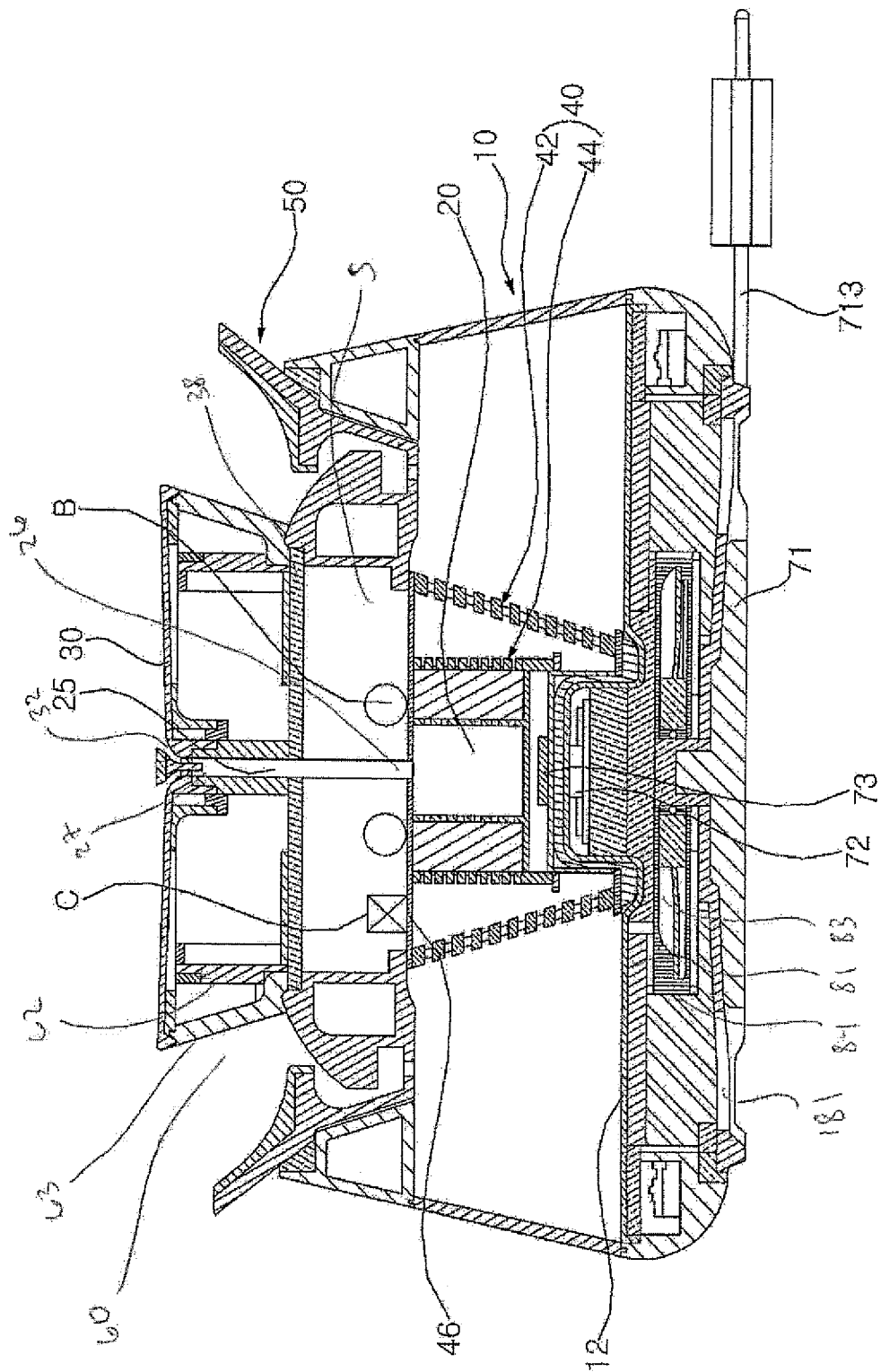
FIG. 2 is a cross-sectional view of the pet water dispenser shown in FIG. 1.

Referring to FIGS. 1 and 2, a circulation structure of the pet water dispenser according to an embodiment will be described. The pet water dispenser may include a water tank or storage chamber 10 in which water is stored, a pump 20 (e.g., a submersible pump) installed in the water tank 10 to pump water stored in the water tank 10, a water supply pipe 25, and a water supply plate or upper plate 30 over which water supplied from the water supply pipe 25 flows.

A water guide or a water receiver 50 may be provided between the water tank 10 and the water supply plate 30 to catch water falling from the water supply plate 30 and to discharge the water back to the water tank 10. Accordingly, water in the water tank 10 can be circulated through the pump 20, the water supply plate 30, and the water guide 50. In addition, a filter or filter assembly 40 may be installed or located in the water tank 10 to filter foreign substances in the water before the water flows into the pump 20.

Figure 3:
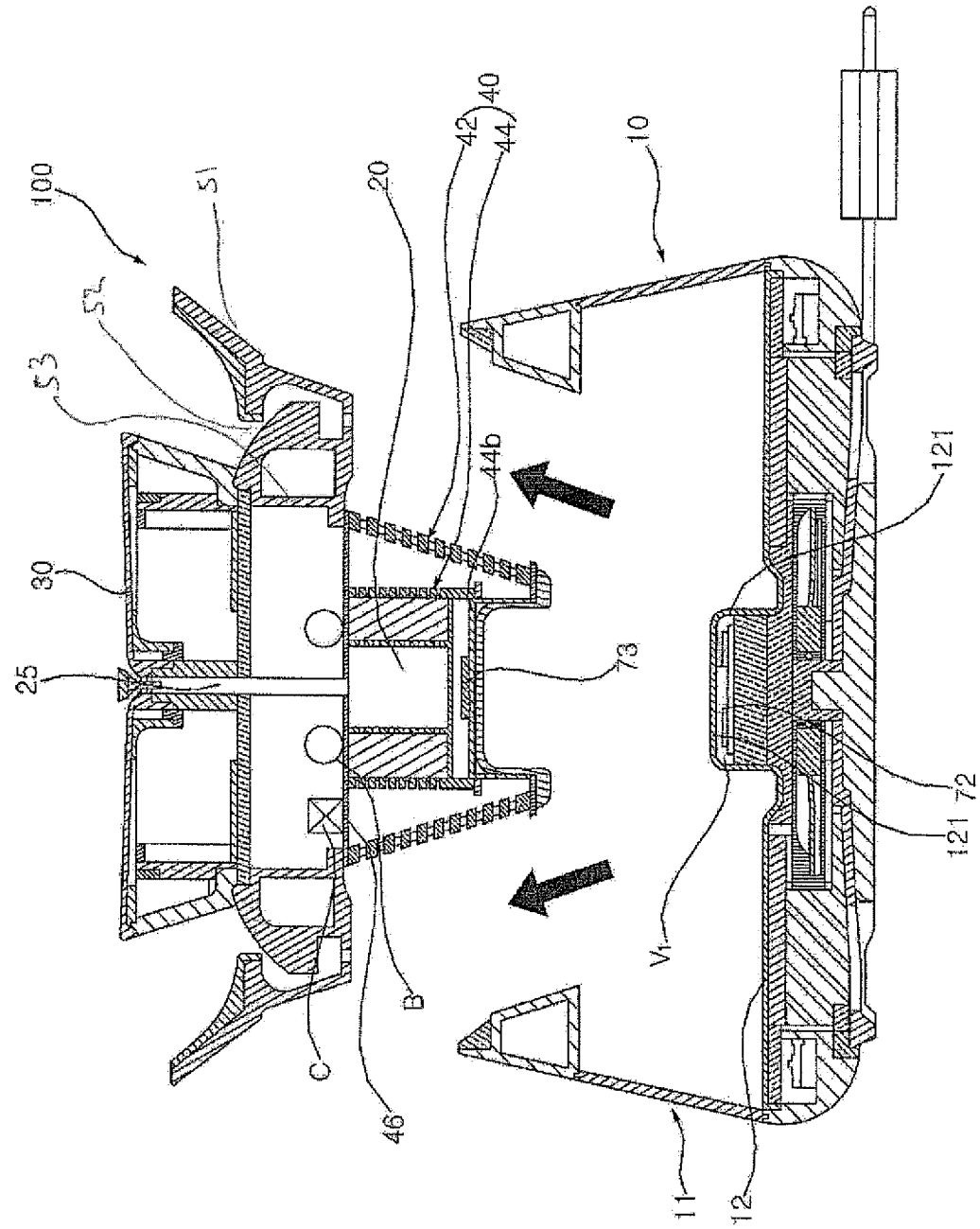
FIG. 3 is a cross-sectional view illustrating the combination of a water tank and an inner assembly according to an embodiment.

Referring to FIGS. 2-3, the water tank 10 may include a bottom plate 12 forming a bottom surface of the water tank 10 and a wall 11 surrounding an interior of the water tank 10 and an inner assembly 100. The wall 11 may extend from the base plate 12, and together the wall 11 and the bottom plate 12 may form a container of the water tank 10. The bottom plate 12 may also be referred to as an inner bottom of the water tank 10, and may be stainless steel or plastic.

The inner assembly 100 may be detachably coupled to (e.g., simply mounted on) the water tank 10. When the inner assembly 100 is inserted or placed into the water tank 10, the inner assembly 100 and the water tank 10 may be coupled. A user may lift the inner assembly 100 to separate the inner assembly 100 from the water tank 10, and then replace or refill the water stored in the water tank 10 or clean the water tank 10.

The inner assembly 100 may include the pump 20, the water supply pipe 25, the water supply plate 30, and the filter assembly 40. The pump 20, the water supply pipe 25, the water supply plate 30, and the filter 40 may be combined to form a single inner assembly 100. The water supply plate 30 may be configured to be removable from the inner assembly 100. The water supply plate 30 may be lifted up and removed to be cleaned, repaired, or swapped with another water supply plate 30 having a different height, shape, angle of inclination, material, etc.

The pet water dispenser may also include an illumination assembly, a water level sensor, a water temperature sensor, a proximity sensor, a contamination level sensor, a water temperature maintenance device, and a sterilizing filter to be described later. Since the pump 20 may supply the water stored in the water tank 10 to the water supply plate 30, and the water supplied to the water supply plate 30 may be circulated back to the water tank 10, a power supply assembly capable of operating the pump 20 will be described with reference to FIGS. 4 to 9.

In a previous water dispenser, a pump may be provided inside a water tank, and a wire is directly connected to the pump and extended to an outside. Wires may be twisted and bent (and thus damaged) according to a movement of the water tank, and a connection portion of the pump and the wires may also be damaged by the tension applied to the wires, causing a short circuit. In addition, it is difficult to separate and assemble the water tank due to various wires connected to the inside and outside of the water tank, thereby making maintenance and repair difficult.

Therefore, the pet water dispenser of the present disclosure comprises a docking station 71 separate from the water tank 10 to which external power is applied, and a wireless communication device or assembly provided at the bottom plate 12 of the water tank 10 and electrically connected to the docking station 71. The wireless communication assembly may include a first wireless power communication device (e.g., a wireless power transmitter and/or a transceiver) 72 provided above the bottom plate 12 and a second wireless power communication device (e.g., a wireless power receiver 73 and/or a transceiver) provided under the bottom plate 12 and connected to the docking station 71 to minimize damage to an electrical wire 713 and prevent a malfunction or short circuit.

The wireless power transmitter 72 and the wireless power receiver 73 may be positioned to align with each other, and positions of the bottom plate 12, wireless power transmitter 72, and wireless power receiver may be configured to prevent damage caused by an external impact, stabilize the water tank 10, and to protect the alignment between the wireless power transmitter and receiver 72 and 73.

The electrical wire 713 may be drawn out from the docking station 71 to an external socket so that external power may be supplied to the docking station 71 to ultimately operate the pump 20. However, a manner in which external power is applied to the docking station 71 is not limited to the structure described in the above description or drawings. For example, external power may be applied to the docking station 71 via wireless power transfer, and the electrical wire 713 may be omitted.

Referring to FIGS. 4 to 7, the docking station 71 may be configured to apply external power to the water tank 10 and may be formed separately from the water tank 10. A base plate 18 may be provided under the bottom plate 12 and spaced away from the bottom plate 12, and the docking station 71 may be provided below both the base plate 18 and the bottom plate 12. The base plate 18 may also be referred to as an outer bottom of the water tank 10.

The wall 11 may include an upper wall 11a and a container support 11b. The container support 11b may form a bottom edge of the wall 11 that extends past the rim of the bottom plate 12 to form the base plate 18. The base plate 18 may be positioned on the docking station 71, and a shape or curvature of the bottom surface of the base plate 18 may be configured to match or correspond with a shape or curvature of the top surface of the docking station 71.

As an example, when a step is formed on the upper surface of the docking station 71, a recess corresponding to the step of the docking station 71 may be formed on the bottom surface of the base plate 18. When a tilt or slope is formed on the upper surface of the docking station 71, a tilt, slope; or contour having a same inclination of the tilt, slope, or contour of the docking station 71 may be formed on the bottom surface of the base plate 18, The base plate 18 may thus fit onto the docking station 71 to be secured to the docking station 71.

The docking station 71 may include a plate-like disc or cylindrical docking station base 711. The docking station base 711 may form a basic structure or overall shape of the docking station 71. By having a disc-shaped structure, the docking station 71 and the water tank 10 can be rotatably engaged. The meaning of "circle" or "disc" or "cylinder" does not mean a geometrically perfect circle, but rather a shape that does not include a straight edge. The docking station base 711 may have a sufficient weight for balancing, and may be referred to as a weight or a main body of the docking station 71.

An optional docking station guide 712 may be formed on the docking station base 711. The docking station guide or step 712 may guide and secure the water tank 10 and the docking station 71 to maintain a docked state. The base plate 18 coupled to the water tank 10 may be seated on the docking station 71 via the docking station guide 712 to dock or connect with a docking connection assembly or device 74.

The docking station guide 712 may have a circular cylinder shape having a predetermined thickness similar to a shape of the docking station base 711 so that the water tub 10 coupled with the docking station 71 can be easily rotated. The docking station guide 712 may have a diameter smaller than a diameter of the docking station base 711.

A top surface of the docking station guide 712 may include an inclined or curved surface. A thickness of the docking station guide 712 may thus be thicker toward a center axis of the docking station 71. The docking station 71 and the water tank 10 may thus be easily docked. A diameter of a lower portion of the container support 11b may be greater than a diameter of a docking terminal 714, and an appearance of the docking terminal 714 can be obscured by the wall 11.

It may not be easy to precisely align the water tank 10 and the docking station 71 so as to connect with the docking terminal 714. For example, the docking station guide 712 may have a relatively small diameter and thickness as compared to the docking station base 711. Even if configurations and/or positions of the water tank 10 and the docking terminal 714 are not exactly matched, the base plate 18 may be guided along an upper surface of the docking station guide 712, and the lower wall 11b may be attached to a side surface of the docking station guide 712 so that an inner side of the container support 11b may be easily docked.

A first guide magnet may be further included for easy docking of the docking station 71 and the water tank 10. For example, a ring-shaped or annular first guide magnet may be provided inside the docking station guide 712, and a ring-shaped or an annular second guide magnet having a polarity opposite to that of the first guide magnet may be provided on the bottom surface of the base plate 18. A magnetic force generated by the first and second guide magnets having opposite polarities may help stabilize a docking between the water tank 10 and the docking station 71. A shape and position of first and second guide magnets are not limited to the annular shapes described in the above description. The docking station guide 712 may be formed integrally with the docking station base 711, or alternatively may be a laminated or stacked structure bonded to the docking station base 711.

Figure 7:
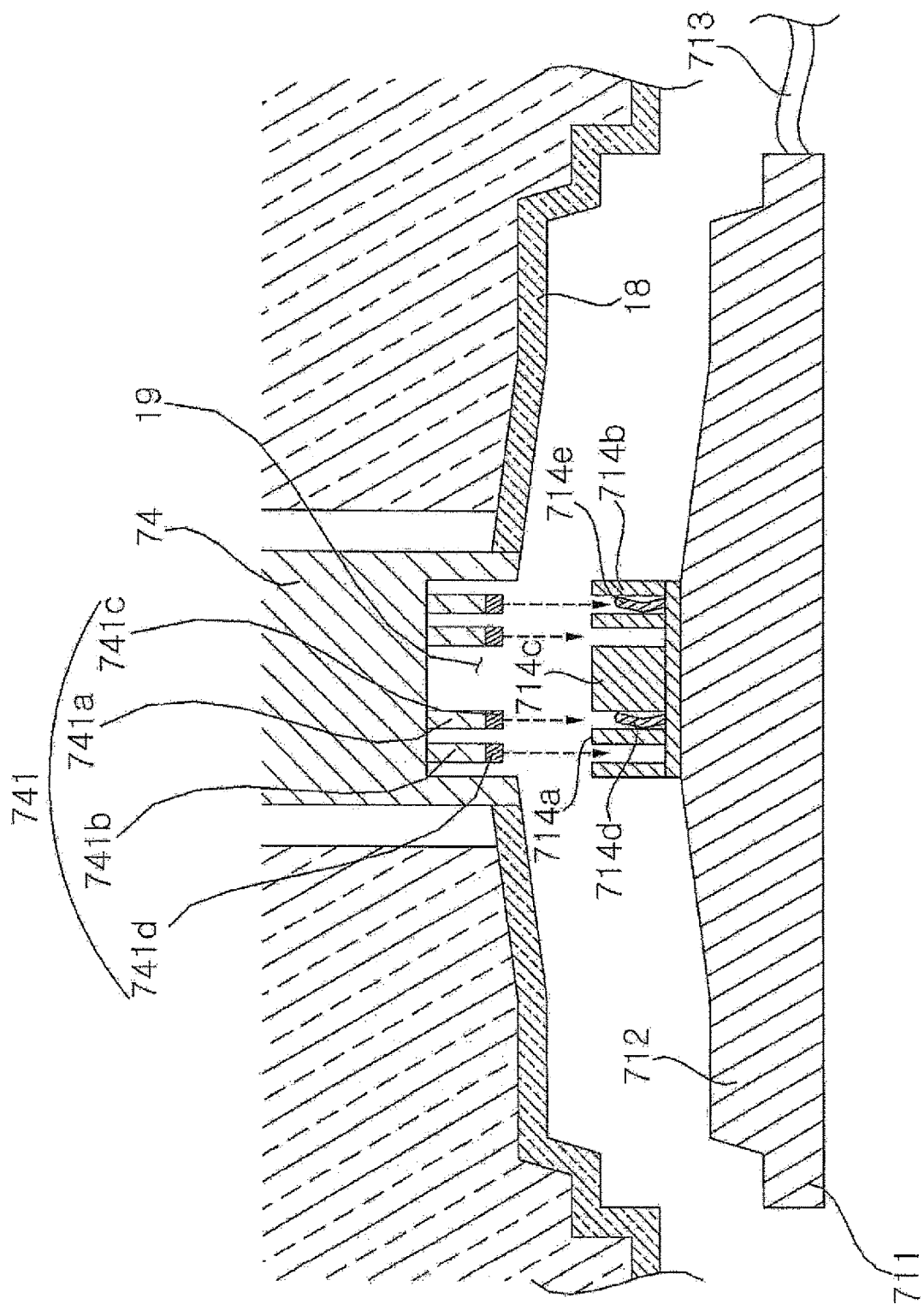
FIG. 7 is a sectional view of a filter and a pump according to an embodiment.

The docking terminal 714 may protrude upward from the upper surface of the docking station base 711 and/or an upper surface of the docking station guide 712. The docking terminal 714 may include a cylindrical first docking portion or ring 714a and a second docking portion or ring 714b that surrounds the first docking portion 714a at an outer side of the first docking portion 714a, The docking terminal 714 may further include a first electrode 714d provided on an inner side of the first docking portion 714a to connect to a second electrode 741c of the docking connection terminal 741 of the docking connection device 74 (FIG. 7), and a third electrode 714e provided on an outer side of the first docking portion 714a to connect to a fourth electrode 741d of the docking connection terminal 741 (FIG. 7).

The first electrode 714d and the third electrode 714e may transmit external power supplied through the electrical wire 713, and may be electrode-coupled to the second and fourth electrodes 741c and 741d, respectively, of the docking connection terminal 741. The docking terminal 714 may further include a third docking portion or cylinder 714c having a cylindrical shape and formed inside the first docking portion 714a.

Figure 5:
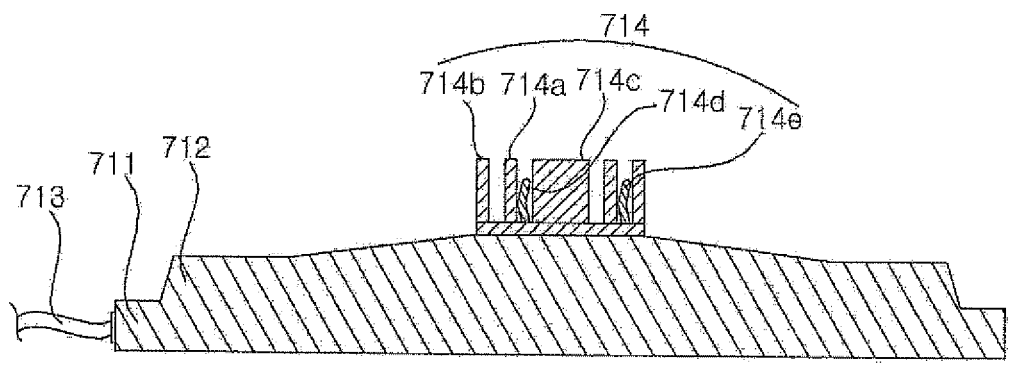
FIG. 5 is a sectional view of a docking station according to an embodiment.
Figure 6:
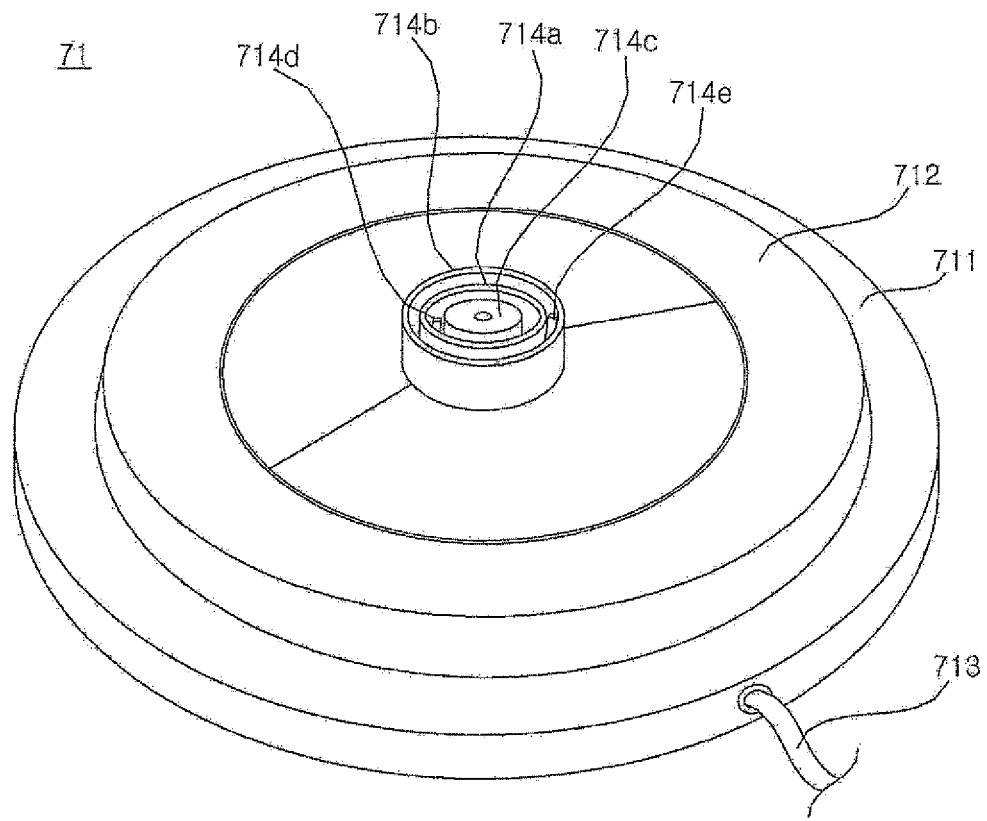
FIG. 6 is a perspective view of the docking station according to an embodiment.

The first to third docking portions 714a, 714b and 714c form a basic structure of the docking terminal 714 and protect the first and third electrodes 714d and 714e. The first electrode 714d may be formed between an inner circumference or side of the first docking portion 714a and an outer circumference or side third docking portion 714c, and the third electrode 714*e* may be formed between an outer circumference or side of the first docking portion 714*a* and an inner circumference or side of the second docking portion 714*b*, as shown in FIG. 5.

The first electrode 714*d* and the third electrode 714*e* may extend upward from a bottom surface of the docking terminal 714. The first electrode 714*d* and the third electrode 714*e* may have a bent line shape or a curved shape, and may each have at least two linear sections having different slopes. Such a shape may provide elasticity and therefore stability to the first and third electrodes 714*d* and 714*e*.

The first electrode 714*d* and the third electrode 714*e* may include a metal or other conductive material through which external power is directly transmitted. Therefore, there is a need to prevent electric shock and damage. Since the first and third electrodes 714*d* and 714*e* are provided between the first, second, and third docking portions 714*a*, 714*b*, and 714*c*, exposure to an outside and thus damage may be minimized.

Heights of the first electrode 714*d* and the third electrode 714*e* may be configured to be lower than heights of the first to third docking portions 714*a*, 714*b*, and 714*c* to further protect the first and third electrodes 714*d* and 714*e*, minimize exposure, and ensure that the first and third electrodes 714*d* and 714*e* do not contact the water tank 10, which may prevent damage, electric shock, and corrosion.

The structure of the docking terminal 714 is not limited to the structure in the above description and the drawings, and may be easily modified by a person skilled in the art. For example, the first, second, and third docking portions 714*a*, 714*b*, and 714*c* may be formed in a square or rectangle shape to prevent rotation.

When the docking terminal 714, docking station base 711, and docking station guide 712 are formed in cylindrical shapes, the docking connection terminal 741 may rotate around the docking terminal 714, and thus the water tank 10 may rotate when it is docked on the docking station 7*t* In addition, the docking station guide 712 may have a predetermined thickness to function as a latching jaw and prevent the docked water tank 10 from being detached or removed from the docking station 71 during the rotation process.

Further, when the docked water tank 10 rotates, stress or force may be dispersed on the docking station guide 712 so that docking terminal 714 does not support the entire weight of the water tank 10, thus preventing damage to the docking terminal 714. Even if the electrical wire 713 is drawn out from the docking station 71, rotation of the water tank 10 on the docking station 71 may minimize damage to the docking station 71 where the electrical wire 713 connected to the docking station 71.

The docking station guide 712 may have a sloped upper surface having a greater thickness toward a center of the docking station 71, and a lesser thickness toward an outer perimeter. A portion of the bottom surface of the water tank 10 may be formed to match the upper surface of the docking station guide 712 to facilitate docking. The bottom surface of the water tank 10 may have a diameter that is larger than a diameter of the docking station guide 712, which may reduce friction during rotation.

The first guide magnet, which may have a ring shape, may be provided inside the docking station guide 712, and the second guide magnet, which may also have a ring shape, may be provided in the portion of the bottom surface of the water tank 10 that is docked on the docking station 71. The shape and position of the guide magnets are not limited to those described in the above description.

A previous pet water dispenser may have electric wires directly connected to a pump and an electric outlet through a water tank. In this case, during use of the water dispenser, the pet could move or rotate the water dispenser, and the wire may be twisted or wound along with the water dispenser. The twisted or coiled wire is not only an obstacle over which people or dogs may trip, but it may also stimulate or provoke pets, which may react by biting and damaging the wires.

In contrast, the electrical wire 713 of the present disclosure may be connected to the docking station 71 so that external power is directly applied to the docking station 71. Since the docking station 71 and the water tank 10 are rotatable, a tensile force or stress applied to the electrical wire 713 may be dispersed by a rotation of the docking station 71 so as not to pull too much on the electrical wire 713. Therefore, if a pet or pet owner catches on the electrical wire 713, spillage of the water tank 10 may be minimized because the water tank 10 is not connected to the electric wire 13, and damage to the electric wire 13 may be minimized due to the rotational movement of the water tank 10 on the docking station 71 and the fact that the electrical wire 713 is drawn out of the docking station 71.

In addition, in the previous water dispenser for pets, if a tension is applied to the electric wire, the connection between the electric wire and the pump may be damaged, risking electric shock. In contrast, even if an instantaneous tension is applied to the electrical wire 713 of the present disclosure, the tension is not transmitted to any electric parts (e.g., the heat sink 84, the pump 20) included in the water tank 10, improving durability and preventing short circuits.

Referring back to FIG. 3, the water tank 10 may include walls 11*a*, 11*b*, and 11*c* forming a side of the water tank 10 and a bottom plate 12 provided on the lower side of the water tank 10. An upper wall 11*a* and a container support 11*b* may form upper and lower sides of a main wall 11*c*, respectively. The upper wall 11*a* and the container support 11*b* may be an opaque material (e.g., stainless steel or pigmented plastic), and the main wall 11*c* may be formed of a transparent material (e.g., glass or plastic).

The bottom plate 12 may be provided between the main wall 11*c* and the container support 11*b*. A container or internal space where water is stored may be formed by the upper and main walls 11*a* and 11*c* and the bottom plate 12, while a container support 11*b* may be provided below the bottom plate 12 to provide a dry or sealed space in which electronic devices to be described later are housed. The water tank 10 may be formed in a cylindrical or truncated cone shape having an inner diameter that decreases upward, but may be formed in various shapes without being limited thereto.

The container support 11*b* of the water tank 10 may extend between the bottom plate 12 and a base plate 18 spaced downward from the bottom plate 12. The docking station 71 may be provided below the base plate 18. The base plate 18 may have a bottom surface having a shape or contour configured to match a shape or contour of the top surface of the docking station 71. A shape of the base plate 18 may correspond to a shape of the docking station base 711, and an inclination of the base plate 18 may correspond to an inclination of the docking station guide 712 so that a docking state of the water tank 10 may be stably maintained.

The docking connection assembly or device 74, which includes the docking connection terminal 741 that electrically couples to the docking terminal 714, may be formed in a space defined by the bottom plate 12, the base plate 18, and the lower wall 11*b*. The docking connection device 74 may be docked with the docking station 71 to receive external power. In order to be docked with the docking station 71, the docking connection device 74 may include a docking connection terminal 741 protruding downward to match the docking terminal 714.

Referring to FIG. 7, the docking device 74 may have a concave portion or cavity formed to accommodate the docking terminal 714. A groove or recess 19 having a circular or cylindrical shape may be formed inside of a first connection protrusion 741a that extends downward from the docking connection device 74 inside of the cavity. The third docking portion 714c may be inserted into the groove 19, which may be formed at a center of the bottom surface the base plate 18.

Similarly, a space may be formed between the first connection protrusion 741a and a second connection protrusion 741b that extends downward from the docking connection device 74 and surrounds an outer side of the first connection protrusion 741a. The first docking connection portion 714a may be inserted into the space between the first and second connection protrusions 741a and 741b. The second docking connection portion 714b may be inserted into a space formed between the second connection protrusion 741b and an inner side of the cavity in the docking connection device 74. The docking station 71 and the docking connection device 74 may therefore be detachably coupled to each other, and a docking state of the water tank 10 may be easily maintained. Furthermore, the docking station 71 and the docking connection device 74 can be coupled at a lower center of the water tank 10.

The second electrode 741c may be formed on a bottom surface of the first connection protrusion 741a, and the fourth electrode 741d may be formed on a bottom surface of the second connection protrusion 741b. The second electrode 741c and the first connection protrusion 741a may be inserted into a space between the third docking portion 714c and the first docking portion 714a to connect to the first electrode 714d. The fourth electrode 741d and the second connection protrusion 741b may be inserted into a space between the first docking portion 714a and the second coking portion 714b to connect to the third electrode 714e. Thus, power may be transmitted between the first electrode 714d and the second electrode 741c and between the third electrode 714e and the fourth electrode 741d.

The second electrode 741c and the fourth electrode 741d may be annular electrodes, as opposed to the more linear first and second electrodes 714d and 714e. Thus, when the water tank 10 rotates, an electric connection between the first electrode 714d and the second electrode 741c and between the third electrode 714e and the fourth electrode 741d may be maintained.

Furthermore, the second electrode 741c and the fourth electrode 741d may be provided at edges of the first connection protrusion 741a and the second connection protrusion 741b. The height of the first and second connecting protrusions 741a and 741b, including the second and fourth electrodes 741c and 741d attached thereto, may be configured to be smaller than a depth of the cavity formed in the docking connection terminal 74 to prevent electrode breakage, especially when the water tank 10 is not docked on the docking station 71.

Configurations of the docking connection device 74 and the docking station 71 are not limited thereto, and the docking terminal 714 and the docking connection terminal 741 may be configured in various ways such that their shapes correspond to each other.

Figure 4:
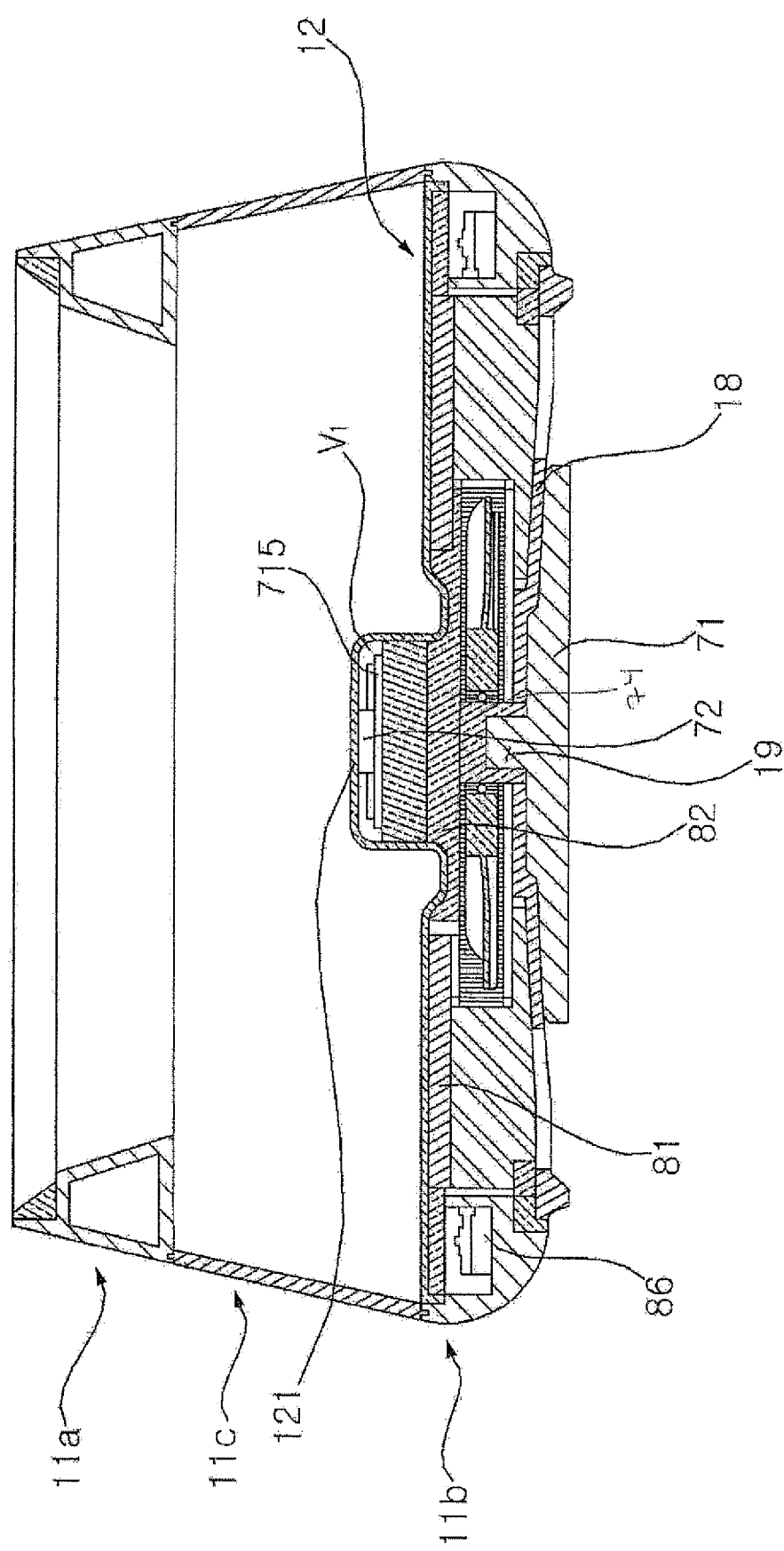
FIG. 4 is a cross-sectional view of the water tank according to an embodiment.

Referring to FIG. 4, a sensor device 86 and temperature control devices 81 and 82 (i.e., thermoelectric element 81 and motor 82) may be provided in the space formed between bottom plate 12, base, 18 and lower wall 11b. A heat sink 84 and a heat radiating fan 83 may be further provided in the space between the bottom plate 12, base, 18 and container support 11b. The heat sink 84 may include a heat dissipation or diffusing plate and heat radiating fins.

The sensor device 86, thermoelectric element 81, motor 82, heat sink 84, and heat radiating fan 83 may consume a relatively large amount of power. Accordingly, in order to efficiently transmit electric power from the docking station 71 to the docking connection device 74, the first and second electrodes 714d and 741c may be directly connected and contact each other, and the third and fourth electrodes 714e and 741d may be directly connected and contact each other.

The external power applied through the docking station 71 and the docking connection terminal 74 can also supply power to the pump 20 via wireless power transfer or induction devices 72 and 73. Power transmission efficiency of wireless power transmission alone is about 70% as compared when there is also electrode coupling, Therefore, external power may be supplied to the heat sink 84, sensor device 86, and other high-consumption devices by the docking of the high-efficiency docking station 71, and the relatively low-power pump 20 may be powered by the wireless power transfer between the first and second wireless power transfer devices 72 and 73. Thus, power transfer efficiency can be optimized.

The first wireless power transfer device 72 (e.g., a wireless power transmitter or transceiver) may be electrically connected to the docking connection device terminal 74 to transmit power to the second power transfer device 73 (e.g., a wireless power receiver or transceiver) to power the pump 20. The first and second wireless power transfer devices 72 and 73 may be connected to a power circuit device 715 on a printed circuit board (PCB) (FIG. 4) instead of the electrical wire 713, which may prevent a short circuit or electric shock. Furthermore, shocks may be prevented because the inner assembly 100 of the water tank 10, which includes the pump 20, may not be connected to the electric wire 713. An alternative embodiment may be completely powered via the wireless power transfer device 72 or 73 instead of the first through fourth electrodes 714d, 741c, 714e, 741d.

Referring to FIGS. 2 to 8, the wireless power transfer devices 72 and 73 may include a wireless power transmitter 72 provided under the bottom plate 12 and a wireless power receiver 73 provided in the inner assembly 100 to correspond to the wireless power transmitter 72. Wireless power transmission (WPT) may control the wireless power transmitter 72 by the power circuit device 715 (FIG. 4) that is electrically connected to the docking connection device 74.

In the wireless power receiver 73, an induction current may be generated from electric current supplied to and a subsequent magnetic flux in the wireless power transmitter 72, so that power can be transmitted wirelessly. However, the wireless power transmitter and receiver 72 and 73 are not limited to inductive coupling based on magnetic induction phenomenon by a wireless power signal, but also an inductive coupling based on electromagnetic resonance phenomenon by wireless power signal of a specific frequency (i.e., via a Magnetic Resonance Coupling method).

The wireless transmitter 72 may be provided in the base plate 18 of the water tank 10 so that it is positioned between the docking station 71 and the bottom plate 12 in the docked state. Referring to FIG. 3, the wireless power transmitter 72 may transmit a wireless power transmission signal from a first accommodation or receiver space V1 formed between the bottom plate 12, the base plate 18, and the lower wall 11b. The wireless power transmitter 72 may be provided on or above the docking connection terminal 741.

The bottom plate 12 may be formed with a protruding portion 121 protruding upward into the water tank 10, and the first accommodation space V1 may be formed in a cavity within the protruding portion 121 under the bottom plate 12. The first accommodation space V1 is not part of an interior of the water tank 10 that stores water, but rather a space formed underneath the water tank 10 so as to remain dry.

Heat generation may be reduced by separating the docking station 71 and the wireless power transmitter 72 from each other by a considerable distance. The wireless power transmitter 72 may generate an electromagnetic field to wirelessly transmit power.

There may be materials having high electric conductivity adjacent to a wireless power transmitter 72, and these materials may generate an electromagnetic field that interferes with an intended change in the electromagnetic field due of the wireless power transmitter 72, and unintended eddy currents may be generated. Unintended heat generation may occur due to these unintended eddy currents, diminishing efficiency of the WPT. External power may be directly applied to a plurality of electrodes, electric wires, or terminals having high electrical conductivity provided inside the docking station 71, and thus efficiency may diminish due heat generation from the eddy current.

Accordingly, the pet water dispenser according to the present disclosure may separate the docking station 71 and the wireless power transmitter 72 from the base plate 18 by including accommodation space V1 formed in the cavity under the protrusion portion 121. Since the wireless power transmitter 72 may be provided in the first accommodation space V1, it is possible to minimize heat generation due to unintended eddy currents without creating a complicated shielding structure to limit an influence of the induced electromagnetic field or without adding a magnetic shielding film. In addition, stability of the WPT stability may be improved.

In order to effectively and stably transmit wireless power, coils of the wireless power transmitter 72 and the wireless power receiver 73 may be accurately aligned so that the magnetic field flux generated by the wireless power transmitter 72 may be accurately transmitted to the coil of the wireless power receiver 73.

The coils of the wireless power transmitter 72 and the wireless power receiver 73 may be accurately aligned despite a rotation of the water tank 10 on the docking station 71 to prevent displacing the magnetic or electromagnetic field. While the wireless power transmitter 72 is kept a considerable distance away from the docking station 71, it is provided as close as possible to the wireless power receiver 73 during the docking state.

Accordingly, the wireless power transmitter 72 may be provided adjacent to the bottom plate 12 and above or on the docking connection terminal 74. The wireless power 72 may be provided right under a top surface of the protruding portion 121, while the wireless power receiver 73 may be provided right above the top surface of the protruding portion 121 when the inner assembly 100 is inserted into and coupled to the water tank 10. Such a configuration can protect the wireless power transmitter 72 even when the water tank 10 is not docked onto the docking station 71 and improve stability of the WPT, as the wireless power transmitter 72 may be provided on the docking connection terminal 74 and separate from the docking station 71.

In contrast, when the wireless power transmitter 72 is provided in the docking station 71, the generated electromagnetic field may escape through the coils of the wireless power receiver 73 by the rotation of the docking station 71. In addition, if the wireless power transmitter 72 is tilted with respect to a ground or floor surface, the magnetic field may escape or propagate to the outer area of the wireless power receiver 73. Therefore, the wireless power transmitter 72 of the pet water dispenser according to the present disclosure may be separate from the docking station 71 to facilitate stable transfer of the magnetic field to the coil of the wireless power receiver 73 by fixing the wireless power transmitter 72 in the first accommodation space V1, thereby achieving excellent wireless power transmission.

The wireless power receiver 73 may be provided above the bottom plate 12 in a second accommodation or receiver space V2 formed inside the inner assembly 100. The inner assembly 100 may include a concave portion or support cylinder 44b provided on a lower side of the inner assembly 100 to engage with the protrusion 121.

Referring to FIG. 8, the concave portion or support cylinder 44b may be formed of a tubular sidewall 44aba perpendicular to the bottom plate 12, and an upper plate 44bb may be provided to shield an upper surface of the sidewall 44ba. The protrusion 121 may be inserted into the support cylinder 44b to contact a bottom surface of the side wall 44ba, but does not contact the upper plate 44bb. The side wall 44ba may have a shape that corresponds to a shape of the protrusion 121. Although FIG. 3 shows that the sidewall 44aba and the protrusion 121 have a cylindrical shape, configurations are not limited thereto, and the sidewall 44aba and the protrusion 121 may have, e.g., a truncated cone shape, or may have a square shape to prevent rotation of the inner assembly 100 on the protrusion 121.

The inner assembly 100 may include a filter or filter assembly 40 that includes a first filter 42 surrounding a second filter 44, and the second filter 44 may surround the pump 20. The second filter 44 may have a tubular outer wall 442 perpendicular to the bottom plate 12 and a support plate 444 partitioning a lower side of the filter into the lower side. The outer wall 442 may extend to couple to the sidewall 44ba of the concave portion 44b to define sides of the second accommodation space V2.

The pump 20 may be provided on the support plate 444, and the upper plate 44bb may extend between sides of the outer wall 442 to shield a lower opening of the second filter 44 and enclose the second accommodation space V2 to prevent water from seeping in. The second accommodation space V2 may therefore be formed between the upper plate 44bb, the support plate 444, and the outer wall 442, and the wireless power receiver 73 may be provided in the second accommodation space V2.

The wireless power transmitter 72 may thus be provided in the projection 121, and the wireless power receiver 73 may be provided on the support cylinder 44b that engages with the projection 121. The wireless power receiver 73 may be positioned between the support cylinder 44b and the second filter 44 to be safely protected from an external environment, and the distance between the wireless power transmitter 72 and the wireless power receiver 73 can be minimized. The first receiver space V1 and the second receiver space V2 in which the wireless power transmitter and receiver 72 and 73 are respectively provided may also be effectively cooled by a colder temperature of the water surrounding the protrusion 121 and the filter assembly 40.

In addition, the wireless power receiver 73 may be configured such that the inner filter assembly 100 is installed in the water tank 10 (see FIG. 2) in a state in which a lower filter cover 43 covers the protruding portion 121. Furthermore, the first accommodation space V1 and the second accommodation space V2 may be "closed spaces;" i.e., a space where side surfaces, a top surfaces, and a bottom surface are all shielded to form a space physically separated and sealed off from other areas.

For example, the first accommodation space V1 may be shielded by the protruding portion 121 at the sides and on top, and a bottom surface may be shielded by the PCB of the power circuit device 715 and/or the terminal connection device 74. The second accommodation space V2 may be formed by the outer wall 442, the support plate 444, and the upper plate 44*bb* to form a closed space. Thus, the first and second accommodation spaces V1 and V2 may be sealed to prevent penetration of moisture and external contaminants, improving the stability of WPT.

The wireless power receiver 73, once receiving electric power from the wireless power transmitter 72, may supply electric power to the electric components (i.e., pump 20, etc.) inside the inner assembly 100. The inner assembly 200 may further include an auxiliary battery B powered by the wireless power receiver 73 so that the pump 20 may work even if the water tank 10 is separated from the docking station 71, and also so that a use life is not restricted by a length of the electrical wire 713.

The auxiliary battery B may be provided inside the inner assembly 100 and may be electrically connected to the wireless power receiver 73. Once the auxiliary battery B has a charge, the wireless power receiver 73 can receive power from the auxiliary battery or battery B instead of the docking station 71 to supply electric power to any electric components (e.g., pump 20) included in the inner assembly 100. The wireless power receiver 73 can then further transmit power back to the wireless power transmitter 72 (or the auxiliary batter B may further power a reverse wireless power transmitter, which transmits power to a reverse wireless power receiver, described below) to power components (e.g., controller, fan, sensors, or thermoelectric element 81), so that even if the electrical wire 713 is disconnected, usage can be maximized. Auxiliary battery B can be connected and recharged when the electrical wire 713 is reconnected. The auxiliary battery B may be provided on an upper filter cover 46 that hermetically seals an upper portion of the pump 20 to create another sealed space shielded from water. Thus, a short circuit, electric shock, and damage to the auxiliary battery B may be prevented.

Since the pet water dispenser can operate even without the electrical wire 713, owners may disconnect the electrical wire 713 when pets drink from the pet water dispenser, eliminating the case where a pet chews or tears the electrical wire 713. Owners may further reconnect the electrical wire 713 in a space away from pets when the pet water dispenser is not in use.

A control unit or controller C may be provided in the same sealed space S as the auxiliary battery B, and the wireless power receiver 73 may be connected to the controller C so that power control can be effectively performed. For example, the auxiliary battery B may be charged while the docking station 71 is coupled to the water tank 10, and the controller C may control the charging of the auxiliary battery B.

In another aspect of the present invention, the pet water dispenser may include a reverse or second wireless power receiver and a reverse or second wireless power transmitter, in addition to the wireless power transmitter 72 and the wireless power receiver 73. The reverse wireless power transmitter may align with and transmit power to the reverse wireless power receiver. The configuration and operation principle of the reverse wireless power transmitter and the receiver may be the same as between the wireless power transmitter and receiver 72 and 73.

The reverse wireless power transmitter may be provided in the second accommodation space V2 near the wireless power receiver 73. The reverse wireless power receiver may be provided in the first accommodation space V1 with the wireless power transmitter 72.

The auxiliary battery B may be electrically connected to the wireless power transmitter 73 and the reverse wireless power receiver. Thus, while the wireless power transmitter and receiver 72 and 73 may transmit external power from the electrical wire 713 to the inner assembly 100, the reverse wireless power transmitter and receiver may transmit power from the auxiliary battery B back down to the base plate 18.

Therefore, even when the docking station 71 is detached, electric components between the bottom plate 12 and the base plate 18 (e.g., motor 82, thermoelectric element 81, sensor device 86) may operate, in addition to the pump 20 and the controller C inside the inner assembly 100.

The filter 40 may purify and/or filter water supplied by the pump 20. The first filter 42 may be a strainer (e.g., a mesh strainer or a truncated conical strainer) having sufficient rigidity and formed with a large number of through holes on its side wall. The first filter 42 may include a lower filter cover 43 formed separately and coupled to a lower surface of the first filter 42, or alternatively formed as a single body with the filter 42. The lower filter cover 43 may cover the protrusion 121 described above, and may fit within the support cylinder 44*b*. The lower filter cover 43 may have a shape corresponding to an outer surface contour of the protrusion 121. When the pump 20 is installed in the inner spaces of the first filter 42 and the second filter 44, filtration performance is enhanced as compared with the case where a filter is provided on one side of the pump 20.

The second filter 44 may include the outer wall 442, which includes a plurality of through holes 441, and an inner wall 443 spaced apart from the outer wall and having a plurality of through holes formed therein. A filter material (e.g., a carbon filter 45) may be provided between the outer and inner walls 442 and 443. The second filter 44 and the support cylinder 44*b* may be separately manufactured and then assembled, or alternatively integrally formed as a single piece.

The pump 20 may be provided in a hollow formed inside the inner wall 443 of the second filter 44 above the support cylinder 44*b*. Water that has passed through the first and second filters 42 and 44 can be sucked into the pump 20 through the through holes formed in the inner wall 443 of the second filter 44 and discharged to the water supply pipe 25. Efficiency may be improved because a separate structure to fix the pump 20 at a predetermined position is not required, as the inner wall 443 and the support plate 444 may support the pump 20.

A first ultraviolet (UV) filter or light 47 to sterilize water introduced into the pump 20 may be installed or located under a lower side or end of the second filter 44 and coupled to the sidewall 44*ba* of the support cylinder 44*b*. A second UV filter or light 48 may be provided between a lower end of the first filter 42 and the lower filter cover 43, and may also couple to the sidewall 44*ba* of the support cylinder 44*b*. There may also be a third UV filter coupled to the water supply pipe 25 to sterilize water discharged from the water supply pipe 25 and flowing to the water supply plate 30.

The upper filter cover 46 may be provided on upper ends of the first and second filters 42 and 44. The water supply pipe 45 may penetrate the upper filter cover 46, which may seal the upper portion of the pump 20 and cover the first and second filters 42 and 44.

The water supply pipe 25 may be arranged in a vertical direction, and may include a water inlet 26 formed in a lower portion and a water outlet 27 formed in an upper portion. Water discharged from the pump 20 may flow through the water inlet 26 and may be discharged through the water outlet 27.

An water supply plate 30 (FIG. 2) may be a plate having a smooth upper surface, and a water supply hole 32 may be formed at a center of the water supply plate 30. A boss may protrude downward from the water supply plate 30, and the water supply hole 32 may penetrate through the boss.

A plate support may be provided below and support the water supply plate 30, and the plate support may be supported by a light emitting device support 62 or a support 63 of an illumination assembly 60 provided between the water supply plate 30 and a partition plate 38. The support 63 may serve as a light diffuser and may also be referred to as a light guide or light guide plate. Details of the illumination assembly 60 are found in U.S. application Ser. No. 16/569,827 filed on Sep. 13, 2019, the entire contents of which are incorporated by reference herein. The water supply pipe 25 may penetrate through a partition plate 38 located below the plate support 36 so that the water outlet 27 communicates with the water supply hole 32 of the water supply plate 30.

Referring back to FIGS. 1-3, a water guide or a water receiver 50 may be provided below the water supply plate 30 and is configured to cover an opened upper side of the water tank 10 so as to receive water dropped from an edge of the water supply plate 30 and guide the received water back to the water tank 10. The water guide 50 may also be referred to as a drip tray or a splash guard.

The water guide 50 may include an outer guide wall 51 forming an outer rim of the water guide 50 and an inner guide wall 53 forming an inner rim to define a drain passage 52 between the outer wall 51 and the inner wall 53. A bottom wall 55 may extend between the outer and inner guide walls 51 and 53, and may include a discharge hole through which water in the drain passage 52 may discharge to the water tank 10. A chamber or a space S accommodating the auxiliary battery B and the controller C may be formed between the upper filter cover 46, the inner wall 53 of the water guide 50, and the partition plate 63. The space S may be a sealed or dry space sealed from water stored in the water tank 10.

The bottom wall 55 may cover a lower portion of the water guide 50 so that the bottom wall 55 does not contact the first and second filters 42 and 44. The upper filter cover 46 may be omitted. Accordingly, the filter 40, the pump 20, the water supply pipe 25, the water supply plate 30, the illumination device 60, and the water guide 50 may be combined or assembled to be integral with each other to form a single inner assembly 100. Since the inner assembly may be separated from the water tank 10, cleaning of the water tank 10 and the repair work of various components can be easily performed.

A thermoelectric element or plate 81 to keep the temperature of the water stored in the water tank 10 at a predetermined temperature may be provided below the bottom plate 12 of the water tank 10. The thermoelectric element 81 may be a Peltier device or a thermoelectric cooler (TEC). A heat radiating fan 83 which is operated by a motor 82, and a heat radiating plate or heat sink 84 may be installed around the heat radiating fan 83. The heat sink 84 may also be referred to as a heat dissipation plate.

A water temperature sensor 85 (e.g., thermometer) may be provided in a space inside the protrusion 121 so that the temperature of the water in the water tank 10 may be sensed. Since the water temperature sensor 85 may have a large contact area with the water stored in the water tank 10, and since the water temperature sensor 85 may be installed inside the protrusion 121 where water moves toward the pump 20, the temperature sensor 85 may accurately sense a temperature of the water. The bottom plate 12 may be made of a material having a high heat thermal conductivity, such as metal (e.g., stainless steel). Alternatively, the water temperature sensor 85 may partially protrude above the bottom plate 12 into the container of the water tank 10 to accurately measure a temperature of the water. When the sensed temperature is not within a set range, the thermoelectric element 81 may be operated to cool or heat the water, and a heat transfer occurs between the thermoelectric element 81 and the heat sink 84.

There may also be another temperature sensor to measure a temperature of the thermoelectric element 81 and/or the heat sink 84. When a temperature of the thermoelectric element 81 is higher than a predetermined temperature or when a temperature of the heat sink 84 is higher than a predetermined temperature, the motor 82 may be operated to drive (i.e., rotate) the heat radiating fan 83.

When the heat dissipation fan 83 is rotated, external air flows into the heat sink 84 through ventilation holes 181 formed in the base plate 18, and then is discharged to an outside through an outermost portion of the ventilation holes 181. The heat sink 84 and the thermoelectric element 81 may thus be cooled.

A mounting space may be formed between an outer surface of the container support 11b and an inner wall provided in an inner space of the container support 11b to be spaced apart from an inner surface of the container support 11b. The mounting space may be formed by recessing an upper surface that extends between the inner wall and the container support 11b. A water level sensor 86 may be provided in the mounting space. The water level sensor 86 may be a load sensor or strain gauge for sensing a weight of the water applied to the bottom plate 12.

Various sensors such as a proximity sensor and a gyro sensor may be installed in the mounting space. A warning lamp or light, which may be or include a ring-shaped light emitting diode, may be attached to a lower edge of the lower wall 11b. When the water level in the water tank 10 detected by the water level sensor 86 is lower than a predetermined value, the warning light may emit light to inform the user of a lack of water or to refill the water tank 10.

Although not shown specifically in the figures, an optional base leg or support capable of adjusting a height of the water tank 10 above a ground or floor surface may be provided. The base leg may adjust according to an inclination of the water tank 10 sensed by the gyro sensor. For example, a height of the leg can be adjusted to correct a tilting of the water tank 10.

The controller C may receive a signal sensed by the water level sensor 86 to calculate a water level value. When the calculated water level value is equal to or lower than a predetermined water level value, the controller C may activate the warning light, and an operation of the pump 20 may be controlled to be stopped.

The proximity sensor may sense how close a pet is to the pet water dispenser. When the controller C determines that a pet is approaching within a predetermined distance range based on a signal received from the proximity sensor, the pump 20 may be operated. The controller C may stop an operation of the pump 20 when it is determined that a pet is not approaching within the predetermined distance range. The controller C may calculate a movement of the pet based on continuous signals from the proximity sensor, and so the controller C may control the pump 20 to be operated only when the pet continues to approach by a predetermined distance or more within the predetermined distance range. When it is determined that a plurality of pets are approaching the pet water sensor via a plurality of signals received from a plurality of proximity sensors, a pumping capacity or rate of the pump 20 may be increased so as to correspond to a number of approaching pets.

A contamination sensor provided in the water tank 10 may sense a contamination level of the water stored in the water tank 10. When the contamination sensor senses a contamination level of the water, it may transmit a signal to the controller C. When the controller C determines that a contamination degree is equal to or greater than a predetermined contamination value based on the received signal, the controller C may control the UV filters 47 and 48 to operate and sterilize the water. The controller C may also stop the operation of the pump 20 and control the warning light 91 to emit a light or a warning alarm to produce a warning sound.

Further, an operation time of the pump 20 according to the signal of the proximity sensor may be continuously stored and analyzed, the controller may predict a pet's consumption and operate the pump 20 accordingly. The pump 20 can be operated so that a water supply amount corresponding to a predicted water supply time (e.g., noon) or time period (e.g., every two hours) may be provided.

When the temperature of the water stored in the water tank 10 is equal to or higher than a first predetermined temperature, the thermoelectric element 81 and/or the heat radiation fan 83 may be operated to cool the water. A temperature of the thermoelectric element 81 may be determined by a thermoelectric element temperature sensor of the thermoelectric element 81. Thus, when the temperature of the thermoelectric element 81 is determined to be a predetermined value or more based on a signal received from the thermoelectric element temperature sensor, the motor 82 may be operated to rotate the heat radiation fan 83 so that the heat sink 84 can cool the thermoelectric element 81.

When an inclination of the water tank 10 is determined to be equal to or greater than a predetermined value based on a received signal from the gyro sensor, the height of one or more supports or legs or a pedestal provided below the water tank 10 may be adjusted to restore the water tank 10 to a normal (or flat) inclination.

Details of the proximity sensor, gyro sensor, contamination sensor, thermoelectric element temperature sensor, and the warning light may be found in U.S. application Ser. No. 16/659,841 filed on Sep. 13, 2019, the entire contents of which is incorporated by reference herein.

This application is related to U.S. application Ser. No. 16/571,245 filed on Sep. 16, 2019, U.S. application Ser. No. 16/571,093 filed on Sep. 14, 2019, U.S. application Ser. No. 16/571,090 filed on Sep. 14, 2019, U.S. application Ser. No. 16/571,076 filed on Sep. 14, 2019, U.S. application Ser. No. 16/571,074 filed on Sep. 14, 2019, U.S. application Ser. No. 16/571,075 filed on Sep. 14, 2019, U.S. application Ser. No. 16/571,073 filed on Sep. 14, 2019, U.S. application Ser. No. 16/570,310 filed on Sep. 13, 2019, U.S. application Ser. No. 16/570,279 filed on Sep. 13, 2019, U.S. application Ser. No. 16/569,827 filed on Sep. 13, 2019, U.S. application Ser. No. 16/659,841, filed on Sep. 13, 2019, and U.S. application Ser. No. 16/569,908 filed on Sep. 13, 2019, the entire contents of which are incorporated by reference herein.

Further, the following Korean Applications are also incorporated herein by reference: 10-2018-0122992 filed on Oct. 16, 2018; 10-2018-0123552 and 10-2018-0123553 filed on Oct. 17, 2018; 10-2018-0131037 filed on Oct. 30, 2018; 10-2018-0131405 filed on Oct. 31, 2018; 10-2019-0059513 and 10-2019-0059514 filed on May 21, 2019; 10-2018-0133062 filed on Nov. 1, 2018; 10-2019-0059787 filed on May 22, 2019; 10-2019-0060918, 10-2019-0060919, and 10-2019-0060920, filed on May 24, 2019; and 10-2019-0080603 and 10-2019-0080604 filed on Jul. 4, 2019.

Embodiments disclosed herein may be implemented as a liquid dispenser that supplies drinking water to an animal such as a pet. However, embodiments disclosed herein are not limited to pets. For example, the liquid dispenser may be used in a zoo to supply drinking water to animals kept in a zoo, research areas, wildlife preservation areas, etc.

In order to clearly illustrate the various layers and regions in the drawings, a thickness of some layers and regions may be enlarged or exaggerated. It will also be understood that when a layer, film, region, plate, etc. is referred to as being "on" or "over" (or "under" or "underneath") another portion, there may be a layer, film, region, plate, etc. therebetween. Conversely, when a layer, film, region, plate, etc. is described as "directly over" (or "directly under") another portion, there may be no other layer, film, region, plate, etc. therebetween.

Embodiments disclosed herein may be implemented as a pet water dispenser or water supply device that can securely transmit wireless power by protecting a wireless power transmission unit or a wireless power transmitter. The pet water dispenser may provide a device capable of minimizing heat generation by a wireless power transmission unit to maintain efficiency. The pet water dispenser may be capable of preventing electric shock and protecting the health of pets safely using the pet water dispenser.

The pet water dispenser may be capable of preventing damage to a connection part of the electric wire by movement of the pet water dispenser, thereby improving durability. Electric shock to pets may be further prevented by providing a docking station that can be disconnected. The pet water dispenser may be capable of stably supplying electric power without damaging electric wires or electric parts even if a water tank is rotated or moved due to an impact applied to a pet water dispenser.

The pet water dispenser may have a water tank easily separated from an inner assembly, can be easily maintained, and can prevent electric shock. The pet water dispenser may protect a wireless power transmission unit or wireless power transmitter from an external impact and may have excellent wireless power transmission stability. A useable area of the pet water dispenser may not be limited to a length of the electric wire, and instead may be enlarged.

The pet water dispenser may be operated by external power or internal power, and may dock onto a docking station to deliver power and transfer external power from an external power supply to create internal power via a power supply apparatus or device. The power supply apparatus may include a wireless power transmission unit or a wireless power transmitter, a wireless power reception unit or a wireless power receiver, and a docking station, and the docking station and the wireless power transmission unit can be separated. The docking station may receive external power from an external power supply. The docking station may be provided below a bottom plate of a water tank when the pet water dispenser is docked on the docking station.

The wireless power transmission unit may be electrically connected to the docking station, and may be provided at a lower side of the bottom plate and spaced apart from the docking station. The wireless power reception unit may be matched (i.e., aligned with) and electrically connected to the wireless power transmission unit, and may be provided on the bottom plate.

The wireless power transmission unit may be provided in a first accommodation or receiving space formed above the docking station. A base may be provided below the bottom plate, and the first accommodation space may be formed between the bottom plate and the base. The docking station may be provided below the base. The bottom plate may have a protruding portion that protrudes upward, and the wireless transmission unit may be provided inside the protruding portion.

The wireless power reception unit may be provided in a second accommodation or receiving space formed in an inner assembly. The inner assembly may include a tubular filtration filter or filter to receive the pump, and a concave portion or cylinder support that shields a lower opening of the filter via an upper plate. The second accommodation space may be formed between the pump and the upper plate.

The wireless power reception unit and the wireless power transmission unit may be aligned with each other. The first accommodation space and the second accommodation space may be closed spaces. The protrusion may be inserted into a bottom surface of the concave portion.

Embodiments disclosed herein may be implemented as a pet water dispenser, which may include a first wireless power device, such as a wireless transmission unit, electrically coupled to the docking station, and a second wireless power device, such as a wireless reception unit, electrically coupled to the first wireless power device. The first wireless power device may be provided in a first accommodation space spaced apart from the docking station, and the second wireless power device may be provided in a second accommodation space spaced above the first accommodation space. The first accommodation space may be provided above the docking station. The pump may be connected to the second wireless power device.

A water tank may include a base spaced apart from a bottom plate, the first accommodation space being formed between the bottom plate and the base, and the docking station being provided below the base. The second accommodating space may be spaced apart from an upper side of the bottom plate. The first accommodation space and the second accommodation space may be closed spaces. A shielding film may be formed on a lower surface of the first accommodation space and an upper surface of the second accommodation space.

The bottom plate of the water tank may be formed with a protruding portion or protrusion that protrudes or extends upward, and the first accommodating space may be provided inside the protruding portion while the second accommodating space may be provided above the protruding portion. A filter may include a filtration filter for receiving the pump, and the second accommodation space may be formed inside the filtration filter or between a second filtration filter and a support cylinder. The support cylinder may form a recess, and can be fitted into the protrusion of the water tank.

A power supply of a pet water dispenser may include a docking station, a first wireless power device (e.g., wireless power transmitter), a second wireless power device (e.g., wireless power receiver), and a secondary battery or an auxiliary battery. The docking station may be detachable from the water tank. The secondary battery may be connected to the first wireless power device or the second wireless power device.

The auxiliary battery may be electrically connected to the wireless power receiver. A base may be provided below a bottom plate of the water tank. The wireless power transmitter may be provided in a first accommodation space formed between the bottom plate and the base, and the docking station may be provided below the base. The docking station may include a plate-shaped docking station base and a docking terminal protruding upward from an upper surface of the docking station base.

A docking connection terminal may be electrically connected to the wireless power transmitter. The docking connection terminal may be provided between the bottom plate and the base, and the docking terminal of the docking station may be inserted into a circular hole of the base to connect to the docking connection terminal. The docking station may be electrode-coupled to the docking connection terminal.

The inner assembly may include a tubular filtration filter or filter that receives the pump, a tubular concave wall or support cylinder, and an upper plate shielding an upper surface of the concave wall. A lower opening of the filtration filter may be connected to the upper surface of the concave wall and may further include a shielding concave portion.

A second accommodation space may be formed between the pump and the upper plate, and the wireless power receiver may be provided in the second accommodation space. The wireless power transmitter may be provided in the first accommodation space and align with the wireless power receiver, which is formed in the second accommodation space. The auxiliary battery may be electrically connected to the wireless power receiver and the wireless power transmitter.

The docking station base and the docking terminal may be rotatable in a cylindrical shape. The docking connection device may be configured to allow the water tank to be docked and electrically connected to the docking station. The docking connection device may be provided between the bottom plate of the water tank and the base, and the first wireless power device may be connected to the docking connection device.

The docking station may be electrode-coupled to the docking connection device. The docking station may include a first connection terminal projecting upwardly, and the docking connection device may include a second connection terminal recessed to match the first connection terminal. The first wireless power device may include a wireless power transmitter, the second wireless power device may include a wireless power receiver, and the secondary or auxiliary battery may be connected to the first and/or second wireless power device.

The first wireless power device may include a first wireless power transmitter and a first (or reverse) wireless power receiver, and the second wireless power device may include a second wireless power receiver aligned with the first wireless power transmitter, and a second (or reverse) wireless power transmitter matched with the first wireless power receiver. In this case, the auxiliary battery may be connected to the second wireless power device.

The pet water dispenser may have a rotatable docking station. Wireless power transmitters may be provided in a separate space and separated from the docking station. A power supply apparatus may include a wireless power transmission unit, a wireless power reception unit, and a detachable docking station. The wireless power transmission unit may be provided below a bottom plate of a water tank and outside the docking station to be stably maintained. A wire fixed to an external power source may be drawn out from the docking station, and the docking station may be rotatably coupled, thereby reducing wire damage.

A water supply plate having a water supply hole from which water is supplied may communicate with a water supply pipe connected to the pump. The power supply apparatus may include a docking station to which external power is applied, a wireless power transmission unit provided under a bottom plate of the water tank and electrically connected to the docking station, and a wireless power reception unit provided on the bottom plate of the water tank. The pet water dispenser may include an auxiliary battery electrically connected to an electric component and the wireless power transmission device.

Embodiments disclosed herein may be implemented as a pet water dispenser that separates a wireless power transmission unit or wireless power transmitter from a docking station, thereby minimizing heat generation by eddy currents in a power system configuration included in the docking station, thereby maintaining efficiency. It is possible to effectively minimize heat generation due to the eddy currents in the surroundings without separately forming a complex shielding film structure.

Since the wireless power transmitting unit may be provided outside and separate from the docking station, the docking station can stably transmit wireless power.

A secondary battery may operate the pet water dispenser when the docking station from which the wire is drawn out is removed and separated from a base of the water tank, thereby preventing electric shock that may occur during chewing or biting of the wire by the animal. The pet water dispenser can therefore be used safely.

In addition, since the pet water dispenser can rotate on the docking station from which the electric wire is drawn, it is possible to reduce damage to a connecting portion of the electric wire and reduce tension applied to the electric wire.

External power may be applied to the docking station to minimize deformation and damage of the wire even if there is a rotation or movement of the water tank. Partial breakage of the electric wire where the electric wire connects to the docking station may be prevented.

Since the pet water dispenser may include a wireless power transmission unit or transmitter provided on a lower side of a bottom plate and a wireless power receiving unit or receiver provided on an upper side of a bottom plate, the pet water dispenser does not include electric wires exposed to water, thereby preventing short circuit and electric shock. Since there is no electric wire to transmit electric power from the water tank to the inner assembly and/or pump, it is easy to separate and assemble the water tank and the inner assembly, simplifying maintenance and cleaning.

Since the wireless power transmission unit is provided below the bottom plate separately from the docking station, the wireless power transmission unit may be prevented from being damaged by an external impact, and the arrangement of the wireless power transmission unit may be fixed so that the stability of wireless power transmission can be improved. Since an auxiliary battery may supply its own power even if no external power is supplied, a useable area of the pet water dispenser is not limited to a length of the electric wire, thereby maximizing utility and stability of an operation of the pump.

While the present invention has been particularly shown and described with reference to exemplary embodiments thereof, it is to be understood that the invention is not limited to the disclosed exemplary embodiments, but, on the contrary, It will be understood by those skilled in the art that various changes and modifications may be made without departing from the spirit and scope of the present invention.

Embodiments disclosed herein may be implemented as a liquid dispenser comprising a tank including a bottom and a wall surrounding the bottom, an inner assembly having a pump and configured to be coupled to the tank, a docking station configured receive external power, the docking station being detachable from the tank, a wireless power transmitter configured to receive power from the docking station, the wireless power transmitter being provided below the bottom of the tank and spaced apart from the docking station, and a wireless power receiver configured to induce power in response to a magnetic flux generated from the wireless power transmitter and to supply power to the pump of the inner assembly.

The wireless power transmitter may be provided in a first space formed above the docking station. The bottom of the tank may include an inner bottom and an outer bottom. The docking station may be rotatably coupled to the outer bottom of the tank.

The outer bottom of the tank may be provided below the inner bottom of the tank, and the first space may be formed between the outer and inner bottoms of the tank. The bottom of the tank may be formed with a projection protruded upward, and the wireless power transmitter may be provided inside the projection.

The wireless power receiver may be provided in a second space formed in the inner assembly. The inner assembly further may include a filter surrounding the pump and a wall and an upper plate provided on an upper end of the wall to form a chamber. A bottom of the filter may be coupled to at least one of the wall or the upper plate. A first space may be formed between the pump and the upper plate. A second space formed above the docking station and the first space may be spaces that may be shielded from liquid stored in the tank. A protrusion formed from the bottom of the tank may be inserted into the chamber of the inner assembly.

Embodiments disclosed herein may be implemented as a liquid dispenser, comprising a tank including a bottom and a wall surrounding the bottom, an inner assembly including a pump, the inner assembly being configured to be coupled to the tank, a docking station configured to receive external power, the docking station being detachable from the bottom of the tank, a first wireless power transmitter configured to selectively connect to the docking station to receive power from the docking station, a first wireless power receiver configured to induce power in response to a magnetic flux generated from the wireless power transmitter and supply power to the pump in the inner assembly, the first wireless power receiver being provided in the inner assembly, and a battery configured to receive power from the wireless power receiver, the battery being provided in the inner assembly.

The bottom of the tank may include an inner bottom and an outer bottom, and the first wireless power transmitter may be provided in a first space formed between the inner and outer bottoms of the tank. The docking station may include a base and a first terminal protruded upward from the base. The outer bottom may include a second terminal configured to insert into the first terminal, wherein, when the first terminal may be inserted into the second terminal, the first terminal receives external power, the second terminal receives power from the first terminal, and the first wireless power transmitter receives power from the second terminal.

The inner assembly may further include a filter assembly surrounding the pump and a chamber formed by a wall and an upper plate coupled to the filter assembly. A first space may be formed between the pump and the upper plate. The first wireless power receiver may be provided in the first space. A second wireless power transmitter and a second wireless power receiver may be provided. The first wireless power transmitter and the second wireless power receiver may be provided in a second space provided in the bottom of the tank, and the first wireless power receiver and the second wireless power transmitter may be provided in the first space. The first wireless power transmitter may be aligned with the first wireless power receiver and the second wireless power transmitter may be aligned with the second wireless power receiver. The battery may be electrically connected to the first wireless power receiver and the second wireless power transmitter.

Embodiments disclosed herein may be implemented as a liquid dispenser comprising a tank including an inner bottom and an outer bottom spaced apart from an inner bottom, an inner assembly configured to receive and discharge liquid from the tank, the inner assembly being coupled to the tank at a position above the inner bottom, and a docking station configured to supply power to the inner assembly, the docking station being coupled to the outer bottom. The docking station may be stepped, an upper surface of the docking station may have a shape that may be curved, and a bottom surface of the outer bottom of the tank may be shaped to correspond to the shape of the upper surface of the docking station. The docking station may be configured to rotate with respect to the outer bottom of the tank.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispenser, comprising:
a tank including a bottom and a wall surrounding the bottom;
an inner assembly having a pump and configured to be coupled to the tank;
a docking station configured receive external power, the docking station being detachable from the tank;
a wireless power transmitter provided in the bottom of the tank and configured to receive power from the docking station when the docking station is attached to the tank, the wireless power transmitter being provided below the bottom of the tank and spaced apart from the docking station; and
a wireless power receiver provided in the inner assembly and configured to induce power in response to a magnetic flux generated from the wireless power transmitter and to supply power to the pump of the inner assembly, wherein:
an upper surface of the docking station includes a terminal that that is received in a lower surface of the tank when the docking station is attached to the tank,
the upper surface of the docking station has a smaller area than that of the lower surface of the tank, and
the bottom of the tank includes a first region that contacts the clocking station when the docking station attached to the tank, and at least one ventilation hole that positioned in a second region of the lower surface of the tank that does not contact the docking station when the docking station is attached to the tank.

2. The liquid dispenser according to claim 1, wherein the wireless power transmitter is provided in a first space formed above the docking station,
wherein the bottom of the tank includes an inner bottom and an outer bottom, and
wherein the docking station is rotatably coupled to the outer bottom of the tank.

3. The liquid dispenser according to claim 2, wherein the outer bottom of the tank is provided below the inner bottom of the tank, and the first space is formed between the outer and inner bottoms of the tank.

4. The liquid dispenser according to claim 1, wherein the bottom of the tank is formed with a projection protruded upward, and the wireless power transmitter is provided inside the projection.

5. The liquid dispenser according to claim 1, wherein the wireless power receiver is provided in a second space formed in the inner assembly.

6. The liquid dispenser according to claim 1, wherein the inner assembly further includes:
a filter surrounding the pump; and
a wall and an upper plate provided on an upper end of the wall to form a chamber, wherein a bottom of the filter is coupled to at least one of the wall or the upper plate.

7. The liquid dispenser according to claim 6, wherein a first space is formed between the pump and the upper plate.

8. The liquid dispenser according to claim 7, wherein a second space formed above the docking station and the first space are spaces that are shielded from liquid stored in the tank.

9. The liquid dispenser according to claim 7, wherein a protrusion formed from the bottom of the tank is inserted into the chamber of the inner assembly.

10. A liquid dispenser, comprising:
a tank including a bottom and a wall surrounding the bottom;
an inner assembly including a pump, the inner assembly being configured to be coupled to the tank;
a docking station configured to receive external power, the docking station being detachable from the bottom of the tank;
a first wireless power transmitter provided in the bottom of the tank and configured to selectively connect to the docking station to receive power from the docking station when the docking station is attached to the bottom of the tank;
a first wireless power receiver configured to induce power in response to a magnetic flux generated from the wireless power transmitter and supply power to the pump in the inner assembly, the first wireless power receiver being provided in the inner assembly; and
a battery configured to receive power from the first wireless power receiver, the battery being provided in the inner assembly, wherein:
the battery is charged by power received via the first wireless power receiver when the docking station is coupled to the tank, and the battery outputs power via the first wireless power transmitter to an electronic component in the tank when the docking station is detached from the tank,
an upper surface of the docking station has a smaller area than that of the bottom of the tank, and
the bottom of the tank includes a first region that contacts the clocking station when the docking station is attached to the tank, and a second region that does not contact the clocking station when the docking station is attached to the tank, the second region including at least one ventilation hole.

11. The liquid dispenser according to claim 10, wherein the bottom of the tank includes an inner bottom and an outer bottom, and the first wireless power transmitter is provided in a first space formed between the inner and outer bottoms of the tank.

12. The liquid dispenser according to claim 11, wherein the docking station includes a base and a first terminal protruded upward from the base, wherein the first terminal includes concentric rings, and a first electrode provided between two of the rings.

13. The liquid dispenser according to claim 12, wherein the outer bottom includes a second terminal configured to insert into the first terminal, the second terminal including a second electrode that is configured to inserted between the two of the rings to be electrically coupled to the first electrode when the docking station is attached to the bottom of the tank, and
wherein, when the first terminal is inserted into the second terminal, the first terminal receives external power, the second terminal receives power from the first terminal, and the first wireless power transmitter receives power from the second terminal.

14. The liquid dispenser according to claim 10, wherein the inner assembly further includes:
a filter assembly surrounding the pump; and
a chamber formed by a wall and an upper plate coupled to the filter assembly.

15. The liquid dispenser according to claim 14, further including a first space formed between the pump and the upper plate, wherein the first wireless power receiver is provided in the first space.

16. The liquid dispenser according to claim 15, further including a second wireless power transmitter and a second wireless power receiver,
wherein the first wireless power transmitter and the second wireless power receiver are provided in a second space provided in the bottom of the tank, the first wireless power receiver and the second wireless power transmitter are provided in the first space, and
wherein the first wireless power transmitter is aligned with the first wireless power receiver and the second wireless power transmitter is aligned with the second wireless power receiver.

17. The liquid dispenser according to claim 16, wherein the battery is electrically connected to the first wireless power receiver and the second wireless power transmitter.

18. A liquid dispenser, comprising:
a tank including an inner bottom and an outer bottom spaced apart from an inner bottom;

an inner assembly configured to receive and discharge liquid from the tank, the inner assembly being coupled to the tank at a position above the inner bottom; and, a docking station configured to supply power to the inner assembly, the docking station being releasably coupled to the outer bottom, wherein:

the docking station includes a first terminal protruded upward from an upper surface of the docketing station, a bottom surface of the outer bottom includes a recess to receive the first terminal and a second terminal configured to be electrically coupled to the first terminal when the docking station is coupled to the outer bottom of the tank, an upper surface of the docking station has a smaller area than that of a lower surface of the tank, and the lower surface of the tank includes a first region that contacts the docking station when the docking station is attached to the tank, and at least one ventilation hole that is positioned in a second region of the lower surface of the tank that does not contact the docking station when the docking station is attached to the tank.

19. The liquid dispenser according to claim 18, wherein the docking station is stepped, the upper surface of the docking station has a shape that is curved, and wherein the bottom surface of the outer bottom of the tank is shaped to correspond to the shape of the upper surface of the docking station.

20. The liquid dispenser according to claim 18, wherein the docking station is configured to rotate with respect to the outer bottom of the tank.

* * * * *